(12) United States Patent
Chen

(10) Patent No.: US 12,498,089 B1
(45) Date of Patent: Dec. 16, 2025

(54) MODULAR LIGHTED TREE

(71) Applicant: Willis Electric Co., Ltd., Taipei (TW)

(72) Inventor: Johnny Chen, Taipei (TW)

(73) Assignee: Willis Electric Co., Ltd., Taipei (TW)

( * ) Notice: Subject to any disclaimer, the term of this patent is extended or adjusted under 35 U.S.C. 154(b) by 0 days.

(21) Appl. No.: 18/637,941

(22) Filed: Apr. 17, 2024

Related U.S. Application Data

(63) Continuation of application No. 17/873,905, filed on Jul. 26, 2022, now Pat. No. 12,000,551, which is a
(Continued)

(51) Int. Cl.
| | |
|---|---|
| *F21S 4/10* | (2016.01) |
| *A41G 1/00* | (2006.01) |
| *A47G 33/06* | (2006.01) |
| *F21V 21/002* | (2006.01) |
| *F21V 23/00* | (2015.01) |
| *F21V 23/06* | (2006.01) |
| *F21V 33/00* | (2006.01) |
| *F21W 121/00* | (2006.01) |
| *F21W 121/04* | (2006.01) |
| *F21Y 115/10* | (2016.01) |

(Continued)

(52) U.S. Cl.
CPC ............. *F21S 4/10* (2016.01); *A41G 1/005* (2013.01); *A41G 1/007* (2013.01); *A47G 33/06* (2013.01); *F21V 21/002* (2013.01); *F21V 23/001* (2013.01); *F21V 23/06* (2013.01); *F21V 33/00* (2013.01); *F21V 33/0028* (2013.01); *H01B 17/00* (2013.01); *H01R 24/20* (2013.01); *H01R 33/92* (2013.01); *H05B 45/00* (2020.01); *F21W 2121/00* (2013.01); *F21W 2121/04* (2013.01); *F21Y 2115/10* (2016.08); *Y10T 29/49117* (2015.01)

(58) Field of Classification Search
CPC ......... A47G 33/06; A41G 1/005; A41G 1/007
See application file for complete search history.

(56) References Cited

U.S. PATENT DOCUMENTS

| | | | | |
|---|---|---|---|---|
| 3,214,579 A | * | 10/1965 | Pacini ................. | H01R 25/006 |
| | | | | 439/110 |
| 5,776,559 A | * | 7/1998 | Woolford .............. | A47G 33/06 |
| | | | | 362/123 |

(Continued)

*Primary Examiner* — William N Harris
(74) *Attorney, Agent, or Firm* — Christensen, Fonder, Dardi & Herbert PLLC; John P. Fonder

(57) ABSTRACT

A lighted artificial tree includes a first tree portion including a first trunk portion, first branches joined to the first trunk portion, and a first light string. The first trunk portion has a trunk connector and a first trunk wiring assembly, the first trunk wiring assembly is electrically connectable to the first light string and the trunk connector, and at least a portion of the first wiring assembly is located inside the first portion. The second tree portion includes a second trunk portion, second branches, and a second light string. The second trunk portion has a trunk connector and a second trunk wiring assembly, the second trunk wiring assembly electrically connectable to the second lighting string and the trunk connector. The second tree portion may be mechanically coupled and electrically connected to the first tree portion by coaxially coupling the first trunk portion to the second trunk portion.

20 Claims, 19 Drawing Sheets

Related U.S. Application Data continuation of application No. 17/137,709, filed on Dec. 30, 2020, now Pat. No. 11,419,374, which is a continuation of application No. 16/575,232, filed on Sep. 18, 2019, now Pat. No. 10,881,158, which is a continuation of application No. 15/840,955, filed on Dec. 13, 2017, now Pat. No. 10,426,208, which is a continuation of application No. 15/250,342, filed on Aug. 29, 2016, now Pat. No. 9,861,147, which is a continuation of application No. 14/599,903, filed on Jan. 19, 2015, now Pat. No. 9,484,687, which is a continuation of application No. 13/240,668, filed on Sep. 22, 2011, now Pat. No. 8,936,379.

(60) Provisional application No. 61/385,751, filed on Sep. 23, 2010.

(51) Int. Cl.
*H01B 17/00* (2006.01)
*H01R 24/20* (2011.01)
*H01R 33/92* (2006.01)
*H05B 45/00* (2022.01)

(56) References Cited

U.S. PATENT DOCUMENTS

| | | | | |
|---|---|---|---|---|
| 6,794,825 | B1* | 9/2004 | Kao | A47G 33/06 |
| | | | | 315/185 S |
| 7,132,139 | B2* | 11/2006 | Yang | A47G 33/06 |
| | | | | 428/17 |
| 7,361,039 | B2* | 4/2008 | Koehler | H01R 13/629 |
| | | | | 439/910 |
| 8,053,042 | B1* | 11/2011 | Loomis | A47G 33/06 |
| | | | | 428/20 |
| 10,721,981 | B2 | 7/2020 | Chen | |
| 11,815,235 | B2 | 11/2023 | Chen | |
| 2004/0145916 | A1* | 7/2004 | Wu | F21V 23/06 |
| | | | | 362/565 |
| 2006/0164834 | A1* | 7/2006 | Kao | A47G 33/06 |
| | | | | 362/249.01 |
| 2007/0230174 | A1* | 10/2007 | Hicks | F21S 13/14 |
| | | | | 362/249.16 |
| 2014/0334134 | A1* | 11/2014 | Loomis | A41G 1/005 |
| | | | | 362/123 |

* cited by examiner

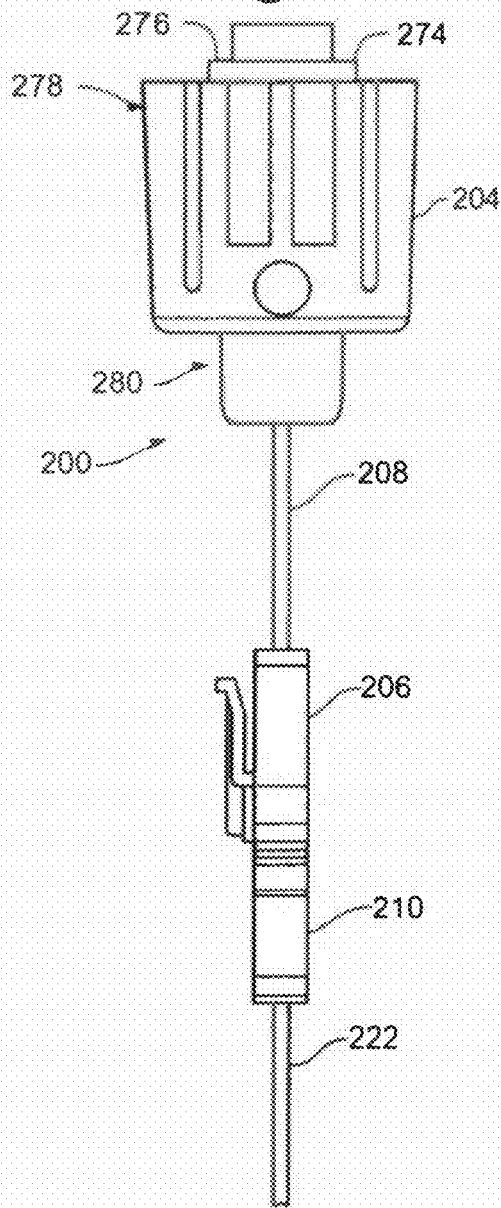
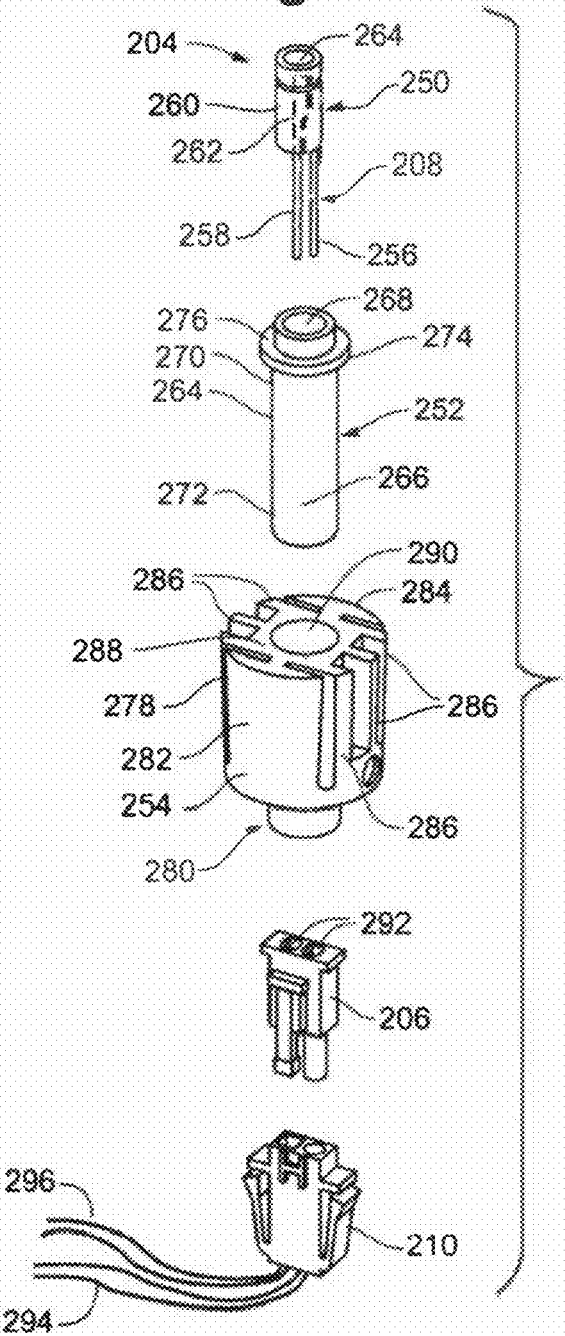
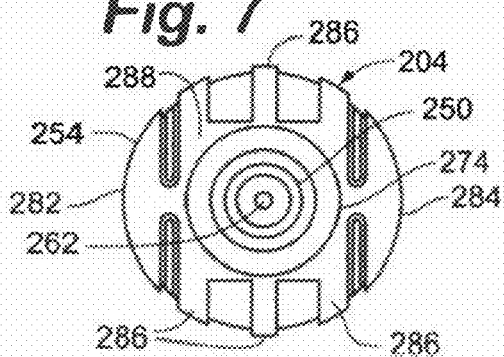

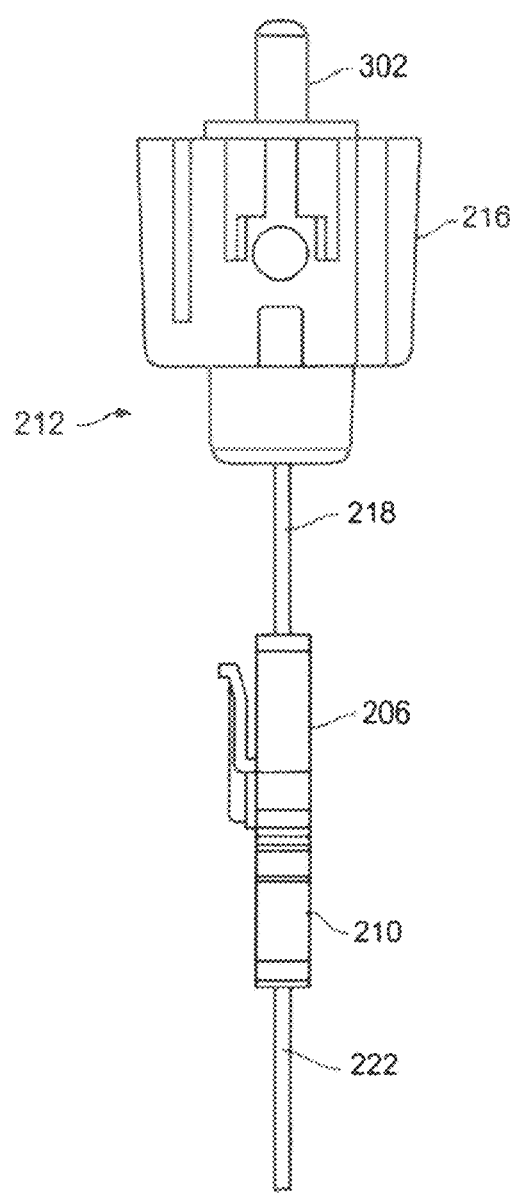
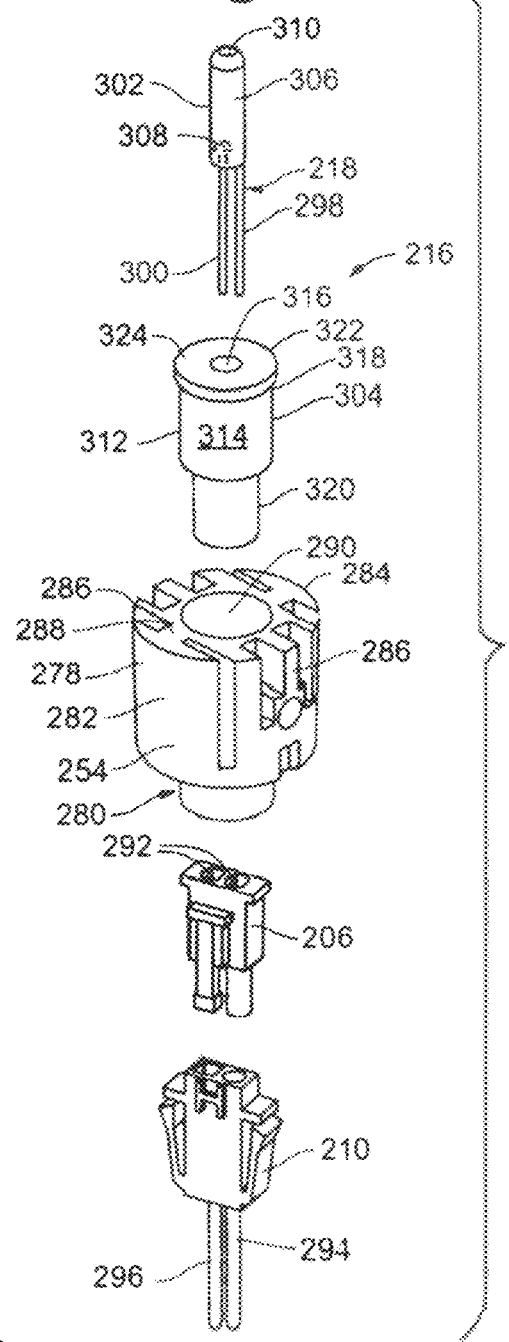
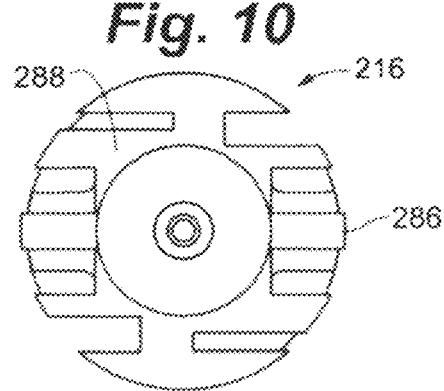

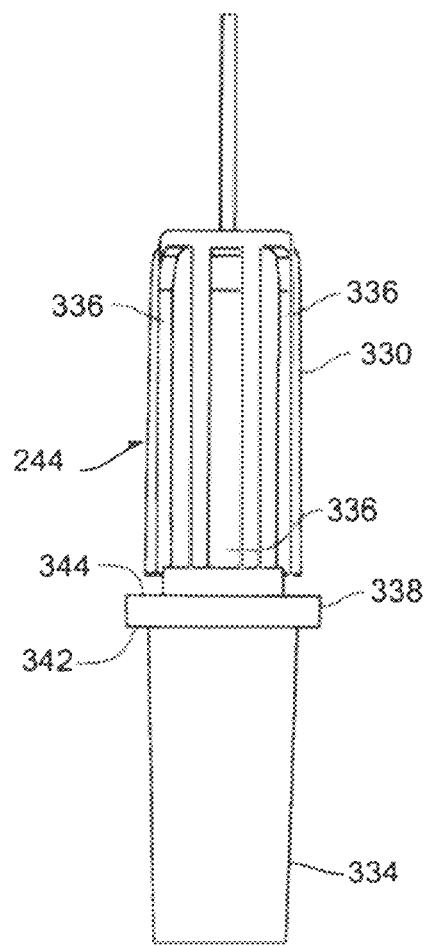
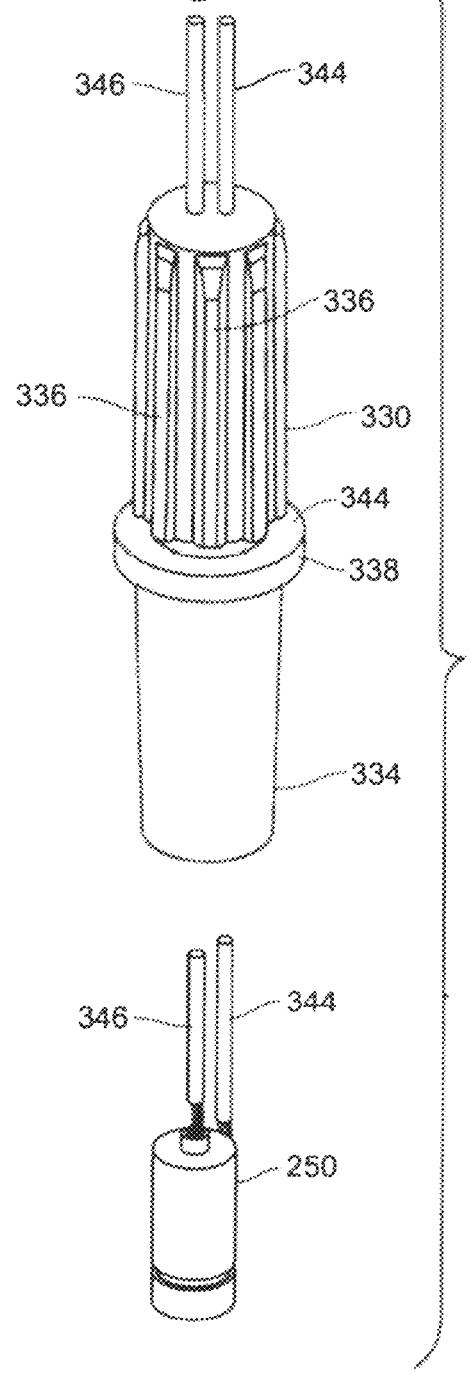
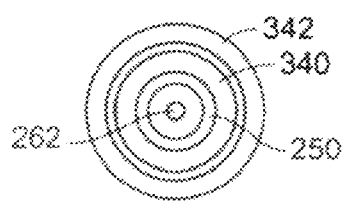

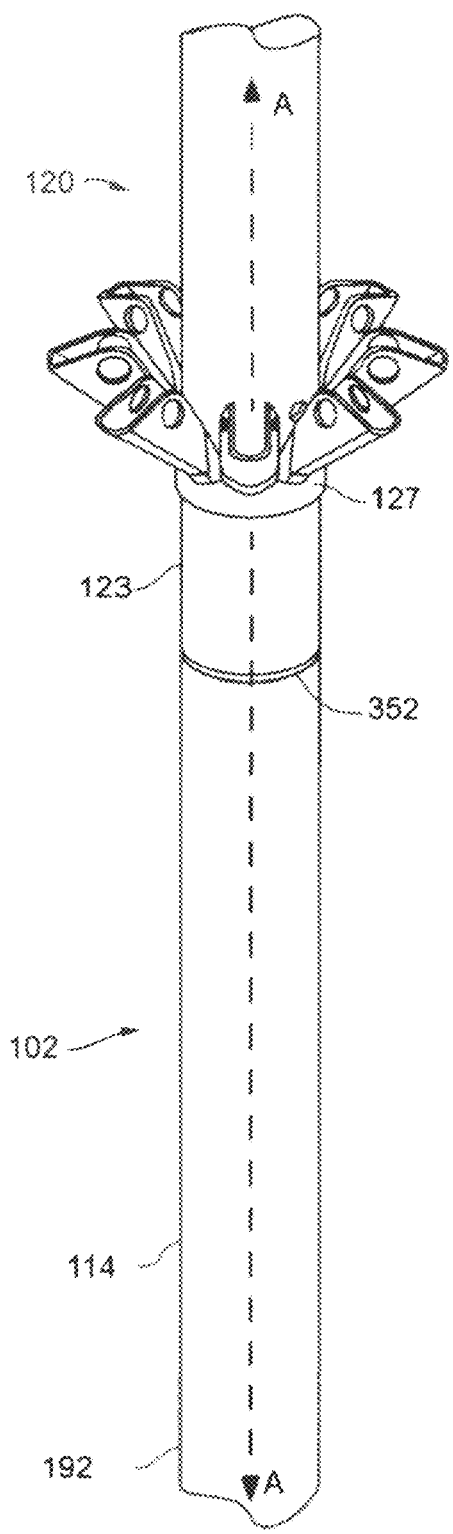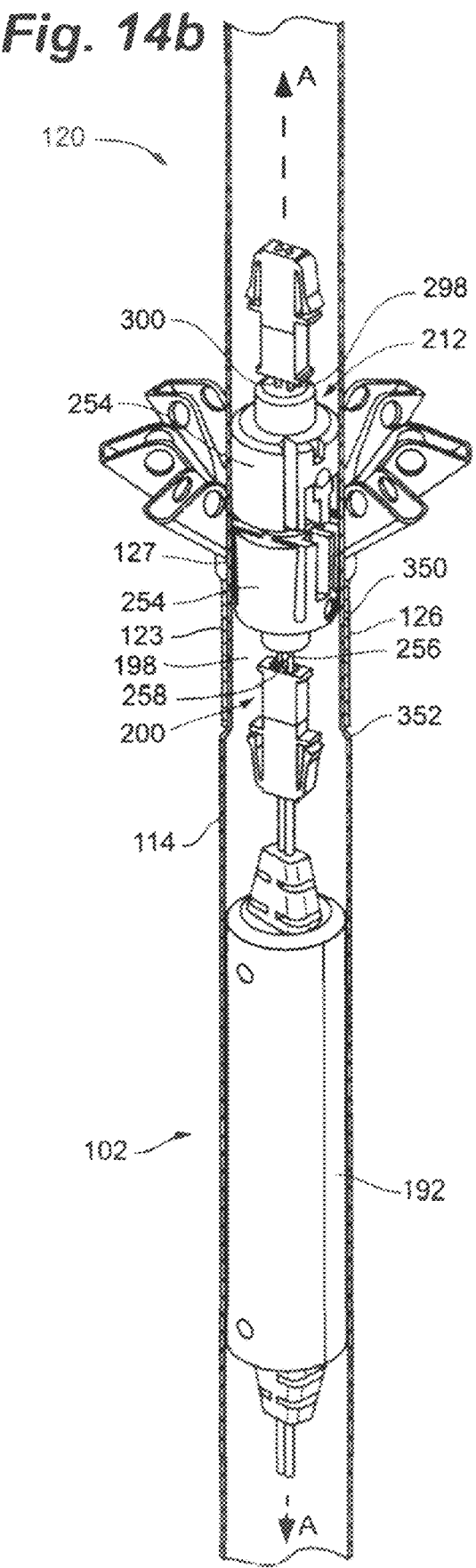

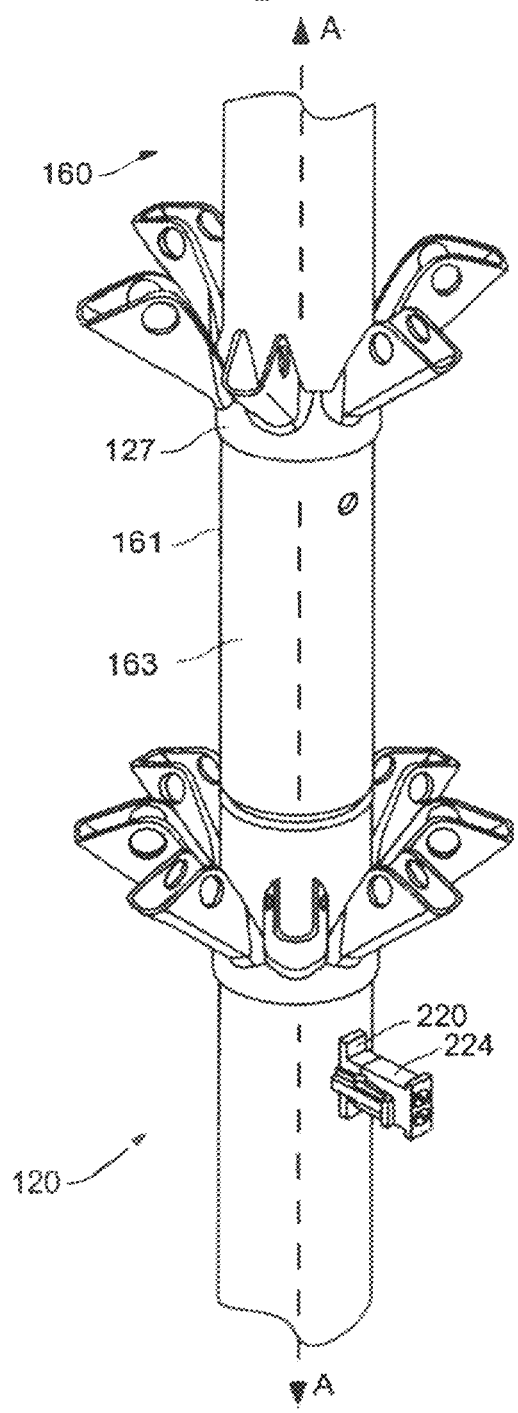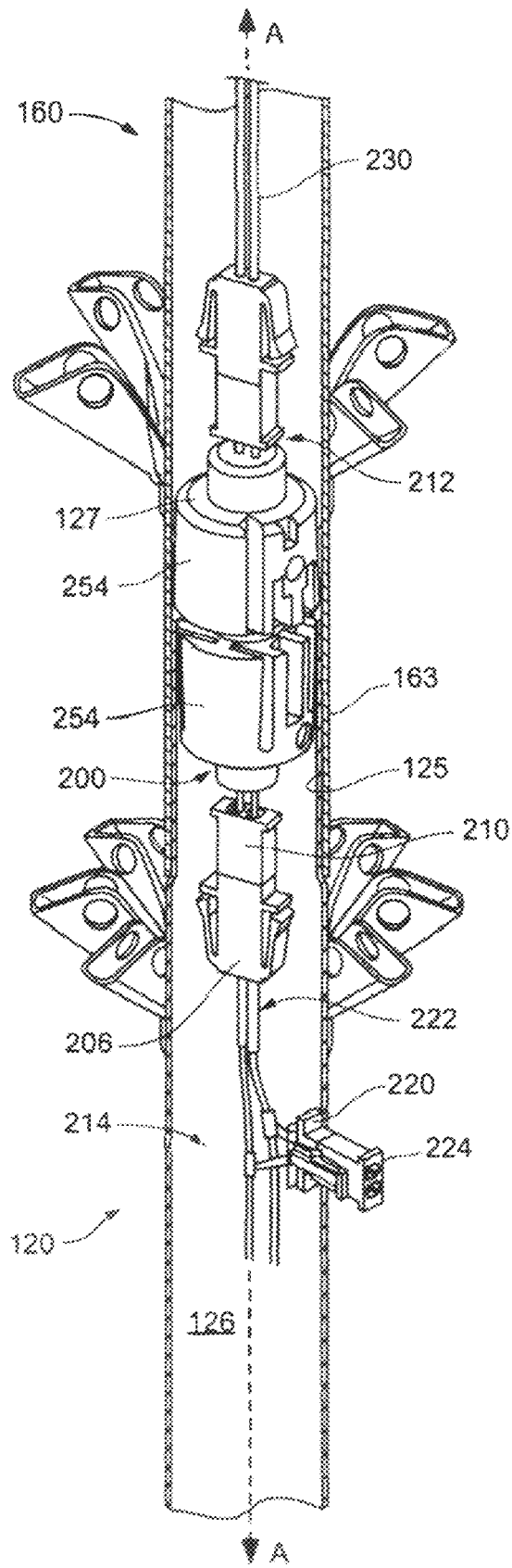

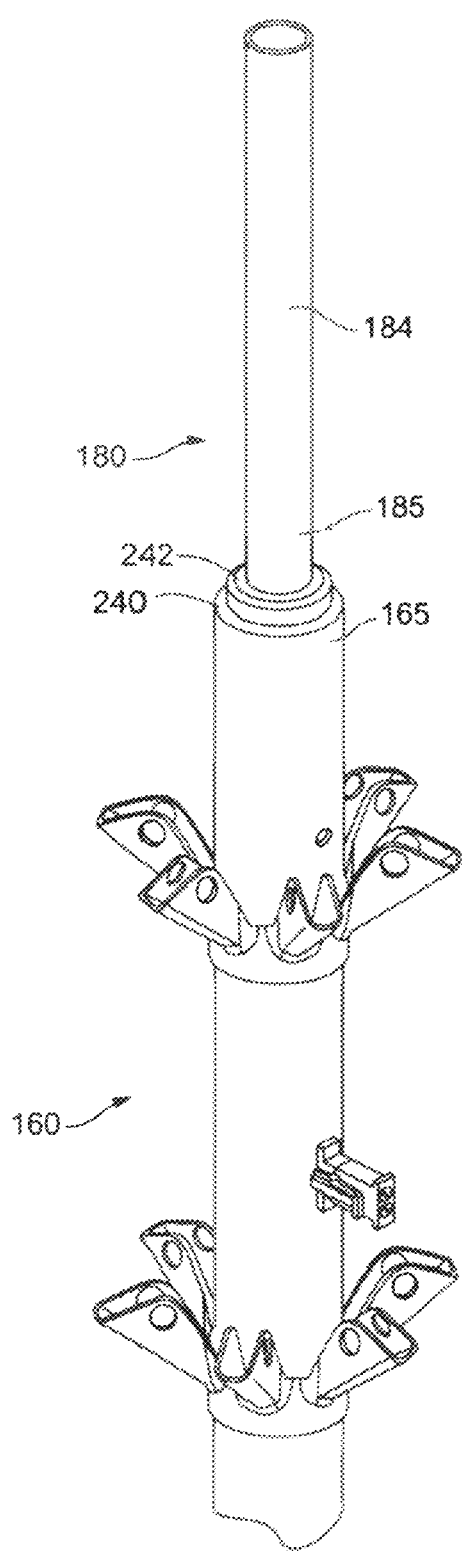
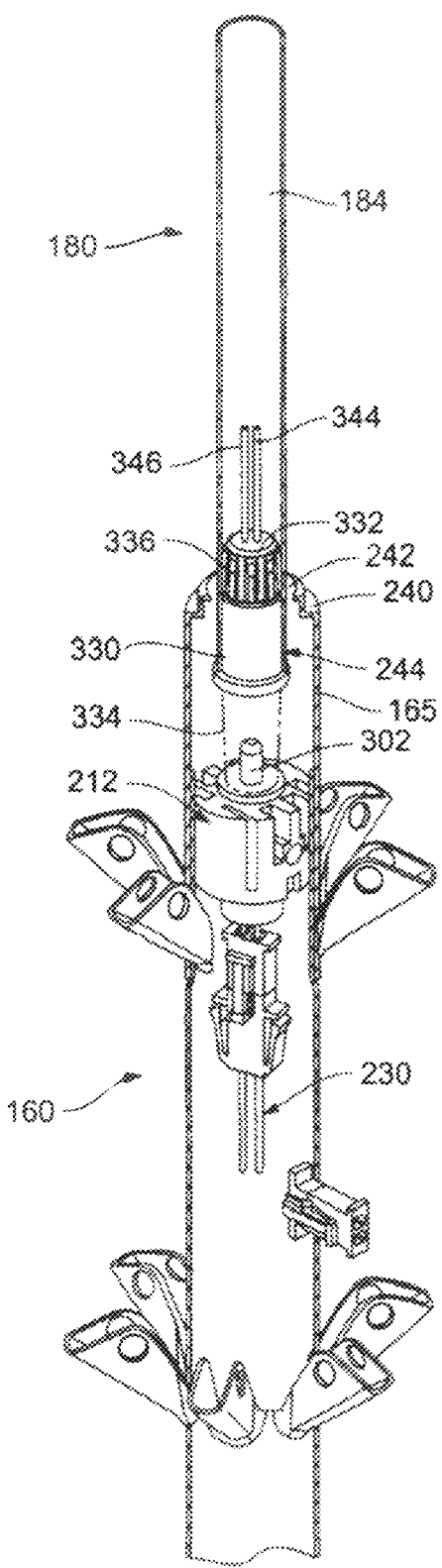
Fig. 16a
Fig. 16b

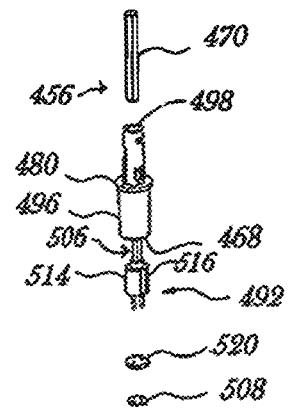
Fig. 22
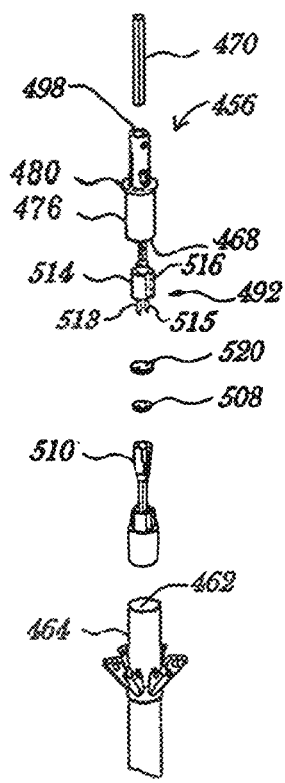
Fig. 24
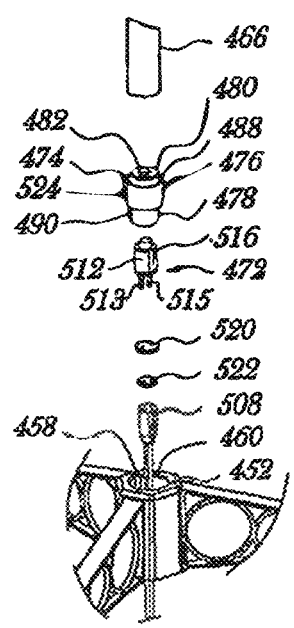
Fig. 23
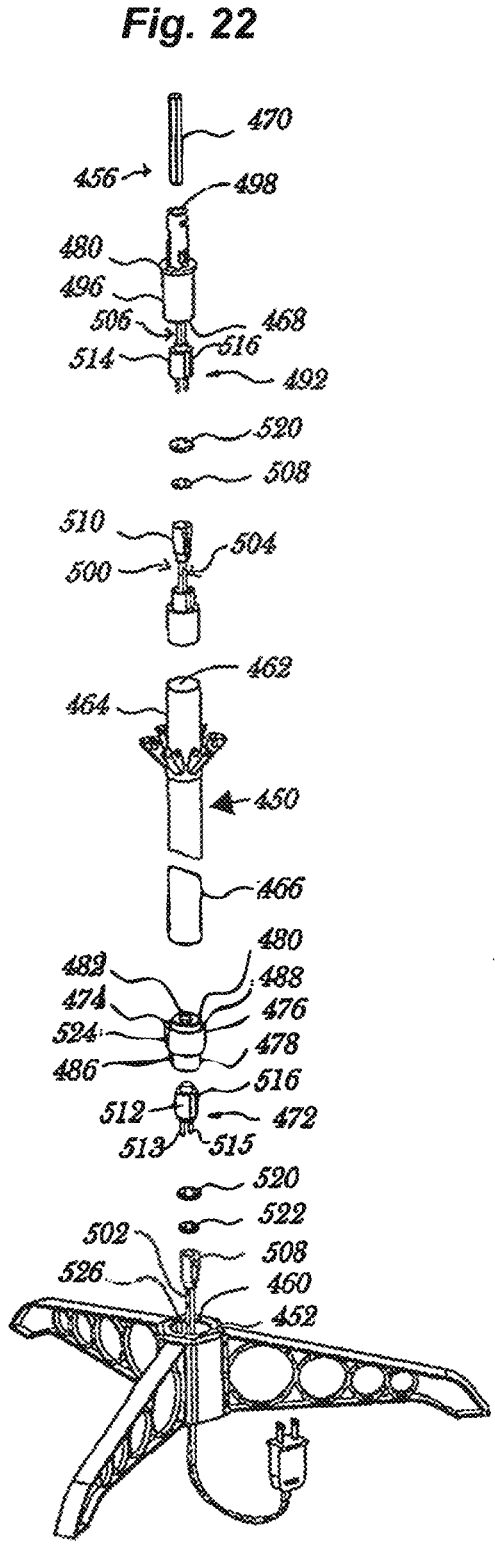

MODULAR LIGHTED TREE

RELATED APPLICATION

The present application is a continuation of U.S. patent application Ser. No. 17/873,905, filed Jul. 26, 2022, which is a continuation of U.S. patent application Ser. No. 17/137,709, filed Dec. 30, 2020, now U.S. Pat. No. 11,419,374, issued Aug. 23, 2022, which is a continuation of U.S. patent application Ser. No. 16/575,232, filed Sep. 18, 2019, now U.S. Pat. No. 10,881,158, issued Jan. 5, 2021, which is a continuation of U.S. patent application Ser. No. 15/840,955, filed Dec. 13, 2017, now U.S. Pat. No. 10,426,208, issued Oct. 1, 2019, which is a continuation of U.S. patent application Ser. No. 15/250,342, filed Aug. 29, 2016, now U.S. Pat. No. 9,861,147, issued Jan. 9, 2018, which is a continuation of U.S. patent application Ser. No. 14/599,903, filed Jan. 19, 2015, now U.S. Pat. No. 9,484,687, issued Nov. 1, 2016, which is a continuation of U.S. patent application Ser. No. 13/240,668, filed Sep. 22, 2011, now U.S. Pat. No. 8,936,379, issued Jan. 20, 2015, which claims the benefit of U.S. Provisional Application No. 61/385,751 filed Sep. 23, 2010, all of which are incorporated herein in their entireties by reference.

FIELD OF THE INVENTION

The present invention is generally directed to artificial trees with decorative lighting. More specifically, the present invention is directed to lighted artificial trees having separable, modular tree portions mechanically and electrically connectable between trunk portions.

BACKGROUND OF THE INVENTION

For the sake of convenience and safety, consumers often substitute artificial trees constructed of metal and plastic for natural evergreen trees when decorating homes, offices, and other spaces, especially during the holidays. Such artificial trees generally include multiple tree sections joined at the trunk and held erect by a floor-based tree stand. Traditionally, consumers wrap strings of lights about the artificial tree to enhance the decorative quality of the tree display. As more and more decorative light strings are draped around the tree, it becomes more and more difficult to provide power to the various light strings distributed throughout the tree.

To ease this burden to the consumer, manufacturers have created "pre-lit" artificial trees. Typical pre-lit trees include an artificial tree with multiple standard light strings distributed about the exterior of the tree. Wires of the light string are clipped to branch structures, while plug ends dangle throughout the branches. Generally, multi-purpose decorative light strings are used in pre-lit trees, often limited to 50 or 100 bulb assemblies, with a bladed power plug for insertion into the back outlet of another light string, or insertion into an alternating current (AC) power source.

As the popularity of such pre-lit trees has grown, so to have the bulk and complexity of pre-lit trees. Along with an increase in the number and density of branches of a typical pre-lit tree comes an increase in the number of lights and light strings on the pre-lit tree. This increased number of branches and lights can significantly increase the weight of the pre-lit tree making it difficult to lift and align individual trunk sections when assembling the tree. Further, the increased number of lights per tree, often as high as 1,000 or 1,500 lights, drastically increases the complexity of interconnecting and powering the numerous light strings.

It can be difficult to find and then properly connect the necessary plugs in order to power all of the light strings on the tree. Light strings may be connected to one another within a given tree section, or sometimes between sections, by connecting the strings end to end. Consumers need to be careful to follow the manufacturer's guidelines and not plug too many light strings together end-to-end and surpass the current-carrying capacity of the light string wiring. Due to such limitations, power plugs of the light strings may include receptacles for receiving other power plugs such that the power plugs may be "stacked" together, plugging one into the other. Short extension cords may be strung along the outside of the trunk to carry power to the various interconnected light strings. The result is a complex web of lighting that often requires a consumer to not only interconnect the plugs and receptacles of individual light strings together, but to stack and plug multiple light strings and cords into multiple power outlets. Some known inventions have attempted to make pre-lit trees more convenient to put together and power. For example, U.S. Pat. No. 1,656,148 to Harris filed Apr. 5, 1926 and entitled "Artificial Christmas Tree" teaches a simple artificial tree with one embodiment having multiple tree sections that join together. The tree includes single bulbs at each end of a branch, with bulb wiring extending from inside a trunk through hollow branches. A bayonet fitting is used to adjoin the sections, a top section having a projecting pin, and a bottom section having an L-shaped bayonet slot. The two sections are coupled by aligning the projection pin with the bayonet slot and rotating to interlock the sections, thereby bringing a pair of spring contacts into alignment with a pair of terminals to make an electrical connection.

Another known artificial tree as described in U.S. Pat. No. 3,970,834 to Smith, filed Dec. 16, 1974 and entitled "Artificial Tree", describes a pre-lit tree made in sections which may be folded for easy storage. The individual tree sections include a threaded male end and a threaded female socket end. The male end of a tree section is screwed into the female end of another section. Wiring for the lights passes from the trunk through holes in branches and connects with individual lights at an interior of the branch. When the tree is screwed together, an electrical connection is made.

However, such known trees still require significant manipulation and handling of the tree sections to securely align and couple the sections together. Further, such known trees fail to disclose mechanical coupling and electrical connection devices and methods that meet the needs of generally larger, heavier artificial trees with complex lighting systems with large numbers of lights.

SUMMARY OF THE DISCLOSURE

The present invention is directed to a modular lighted artificial tree that includes a first tree portion that may be mechanically coupled and electrically connected to a second tree portion. The first tree portion includes a first trunk portion, multiple branches joined to the first trunk portion, and a first light string affixed to some of the branches. The first trunk portion has a first trunk body and a trunk connector, and at least a portion of the trunk connector is housed within the first trunk body and electrically connected to the first light string. The second tree portion includes a second trunk portion, multiple branches joined to the second trunk portion, and a second light string affixed to some of the branches. The second trunk portion has a trunk body and a trunk connector, at least a portion of the trunk connector housed within the second trunk portion and electrically connected to the second light string. The second tree portion is mechanically and electrically connectable to the first tree portion by coupling a lower end of the second trunk body to an upper end of the first trunk body along a common vertical axis, thereby causing the trunk connector of the first trunk portion to make an electrical connection with the trunk connector of the second trunk portion. The electrical connection is made independent of any rotational orientation of the first trunk portion relative the second trunk portion about the common vertical axis.

In another embodiment, the present invention comprises at least one connector assembly for mechanically and electrically joining a trunk section to a base section. Alternatively, the connector assembly can join two trunk sections together. Each connector assembly can comprise a supporting connector, a plug and a socket. The supporting connector provides a gapless connection of the two trunk sections together as well as mechanical support to maintain the alignment of the trunk section and the base once connected. The supporting connector can also position the plug so as to align with plug with the socket.

The supporting connector comprises an elongated body having a first end insertable into the base section and into a trunk section to join the base and a trunk section. The supporting connector further comprises a positioning portion for defining the relative positions of the base and the trunk section and can also position the plug relative to the socket. The positioning portion defines a shoulder on the elongated body for engaging a corresponding shoulder within the base section that is positioned such that a portion of the trunk section is received within the base section when connected by the elongated body. By receiving a portion of the trunk section within the base section presents an aesthetically appealing appearance of a continuous trunk without gaps between the base section. The positioning portion can further define a key protrusion adapted to align with a groove in the wall of the base section to prevent the supporting connector from rotating when aligning the trunk and base sections.

The supporting connector can further define a lumen for receiving and positioning the plug. The corresponding socket is positioned within the base section such that the plug is engaged to the socket when supporting connector links the trunk section and base section together. The supporting connector can further define a groove in the wall of the lumen adapted to receive a corresponding key protrusion on the exterior of the plug preventing rotation of the plug independently from the supporting connector. The supporting connector can comprise a plastic material to provide a friction fitting between the supporting connector and the plug such that separating the tree section from the base section causes the plug to be separated from the socket. According to an embodiment, both the male and sockets each comprise a guard having at least one hole for receiving the electrical prong of the plug.

According to an embodiment of the present invention, the present invention can further comprise a top connector assembly for linking the top trunk section with the remained of the tree. Unlike other trunk sections, the trunk of the top trunk section can have a thinner diameter than the other trunk section to provide an aesthetically desirable appearance. Similar to the supporting connector assembly, the top connector assembly comprises a top connector, a plug and a socket. The top connector assembly comprises an elongated body having a first end insertable into an end of a trunk portion positionable beneath the tree top and a receiving port for receiving the end of the tree top. The top connector assembly can also define a positioning portion comprising a rim for engaging the end of the trunk section below the top trunk section to limit the extent to which the top connector assembly can be inserted into the trunk assembly. According to an embodiment of the present invention, the top connector can be visible while connecting the top trunk portions.

In another embodiment, the present invention comprises a lighted artificial tree that includes a first tree portion including a first trunk portion, a first plurality of branches joined to the first trunk portion, and a first light string affixed to a portion of the first plurality of branches. The first trunk portion has a first trunk wall defining a first trunk interior, a trunk connector and a first trunk wiring assembly, the first trunk wiring assembly is electrically connectable to the first light string and the trunk connector, and at least a portion of the first wiring assembly is located within the first trunk interior. The tree also includes a second tree portion including a second trunk portion, a second plurality of branches joined to the second trunk portion, and a second light string affixed to a portion of the second plurality of branches. The second trunk portion has a second trunk wall defining a second trunk interior, a trunk connector and a second trunk wiring assembly, and the second trunk wiring assembly is electrically connectable to the second lighting string and the trunk connector. At least a portion of the second wiring assembly is located within the second trunk interior. Further, the second tree portion is mechanically coupleable to the first tree portion by coaxially coupling the first trunk wall to the second trunk wall to form a circumferential interference fit between the first trunk wall and the second trunk wall, and the second tree portion is electrically connectable to the first tree portion such that a portion of the trunk connector of the first trunk portion contacts a portion of the trunk connector of the second trunk portion upon the coaxial coupling of the first trunk wall and the second trunk wall, thereby creating an electrical connection between the first wiring assembly and the second wiring assembly.

In another embodiment, the present invention comprises a lighted artificial tree that includes a first tree portion including a first trunk portion, a first plurality of branches joined to the first trunk portion, and a first light string affixed to a portion of the first plurality of branches, the first trunk portion having a first trunk body and a trunk connector, and at least a portion of the trunk connector is housed within the first trunk body and electrically connected to the first light string. The tree also includes a second tree portion including a second trunk portion, a second plurality of branches joined to the second trunk portion, and a second light string affixed to a portion of the first plurality of branches, the second trunk portion having a trunk body and a trunk connector, and at least a portion of the trunk connector is housed within the second trunk portion and electrically connected to the second light string. The second tree portion is mechanically and electrically connectable to the first tree portion by coupling a lower end of the second trunk body to an upper end of the first trunk body along a common vertical axis, thereby causing the trunk connector of the first trunk portion to make an electrical connection with the trunk connector of the second trunk portion, the electrical connection being made independent of any rotational orientation of the first trunk portion relative the second trunk portion about the common vertical axis.

In another embodiment, the present invention comprises a lighted artificial tree that includes a first tree portion including a first trunk portion, a first plurality of branches joined to the first trunk portion, and a first light string, the first trunk portion having a first trunk wall defining a first trunk interior, a first trunk connector and a first trunk wiring assembly, the first trunk wiring assembly electrically connectable to the first light string and the first trunk connector, and at least a portion of the first wiring assembly and a portion of the first trunk connector are located within the first trunk interior. The lighted artificial tree also includes a second tree portion connectable to the first tree portion and including a second trunk portion, a second plurality of branches joined to the second trunk portion, and a second light string, the second trunk portion has a second trunk wall defining a second trunk interior, a second trunk connector and a second trunk wiring assembly. The second trunk wiring assembly is electrically connectable to the second lighting string and the second trunk connector, at least a portion of the second wiring assembly and a portion of the second trunk connector located within the second trunk interior. The second tree portion is mechanically and electrically connectable to the first tree portion by aligning the second trunk portion with the first portion along a common axis such that a portion of the first trunk wall is coupled to a portion of the second trunk wall for form a first mechanical connection, and a first portion of the first connector is received by the second connector, thereby forming a second mechanical connection between the first trunk portion and the second trunk portion and forming an electrical connection between the first wiring assembly.

In another embodiment, the present invention includes a lighted artificial tree that includes a first trunk portion having a first end, a second end, and a first trunk connector; a second trunk portion having a first end, a second end, and a second trunk connector, the second trunk portion being mechanically and electrically connectable to the first trunk portion by coupling the first end of the second trunk portion to the second end of the first trunk portion and the first trunk connector to the second trunk connector. The tree also includes a light string that has a first portion having a first plurality of lighting elements electrically connected in series, a second portion having a second plurality of lighting elements electrically connected in series, the first plurality of lighting elements electrically connected in series to the second plurality of lighting elements through the first trunk connector and the second trunk connector when the first trunk portion is coupled to the second trunk portion.

In another embodiment, the present invention includes a modular lighted artificial tree that includes a first trunk portion including a first end, a second end, a first trunk wiring harness and a first trunk connector, the first trunk wiring harness electrically connected to the first trunk connector; a second trunk portion including a first end, a second end, a second wiring harness having a light string clip and a second trunk connector, the second trunk portion being electrically connectable to the first tree portion by coupling the first end of the second trunk portion to the second end of the first trunk portion such that the first trunk connector is electrically connected to the second trunk connector. The modular lighted artificial tree also includes a first plurality of branches attached to the second trunk portion and a first light string including a plurality of lighting elements, light string wiring, and an end clip, the plurality of lighting elements connected electrically by the light string wiring, a portion of the light string wiring affixed to the first plurality of branches, and the end clip electrically connected to the light string wiring. The end clip of the first light string is detachably connected to the light string clip such that the first light string is electrically connected to the first wiring harness and the second wiring harness.

In another embodiment, the present invention includes a method of manufacturing a modular, lighted artificial tree. The method includes assembling a first trunk wiring harness, including attaching first and second end connectors, to a pair of bus wires and attaching a light string connector to the pair of bus wires; connecting the first end connector to a first trunk connector assembly to form an electrical connection between the first wiring harness and the first trunk connector; attaching the light string connector to a trunk portion of the tree at an opening in a wall of a trunk of the tree such that at least a portion of the light string connector is located in an interior of the trunk; inserting a portion of the first wiring harness and the first trunk connector assembly into the trunk of the tree; and connecting an end of a pre-assembled light string to the first light string connector, such that the light string is electrically connected to the pair of bus wires.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE FIGURES

The invention can be understood in consideration of the following detailed description of various embodiments of the invention in connection with the accompanying drawings, in which:

FIG. 5 is a right side view of a trunk connector assembly connected to a portion of a trunk wiring harness, according to an embodiment of the present invention;

FIG. 6 is an exploded view of the trunk connector assembly and wiring assembly connector as depicted in FIG. 5;

FIG. 7 is a top view of the trunk connector assembly of FIGS. 5 and 6;

FIG. 8 is a right side view of another trunk connector assembly connected to a portion of a trunk wiring harness, according to an embodiment of the present invention;

FIG. 9 is an exploded view of the trunk connector assembly and wiring assembly connector as depicted in FIG. 8;

FIG. 10 is a top view of the trunk connector assembly of FIGS. 8 and 9;

FIG. 11 is a right side view of an embodiment of a trunk-top connector assembly;

FIG. 12 is an exploded view of the trunk-top connector assembly of FIG. 11;

FIG. 13 is a top view of the trunk-top connector assembly of FIGS. 11 and 12;

FIG. 14a is a front perspective view of a base portion joined to a lower trunk portion of the tree of FIG. 1 and the trunk of FIG. 2;

FIG. 14b is a cross-sectional view of the base portion joined to the lower trunk portion of FIG. 14a;

FIG. 15a is a front perspective view of a lower trunk portion joined to a middle trunk portion of the trunk of FIG. 2;

FIG. 15b is a cross-sectional view of the lower trunk portion joined to a middle trunk portion of FIG. 15a;

FIG. 16a is a front perspective view of a middle trunk portion joined to an upper trunk portion of the trunk of FIG. 2;

FIG. 16b is a cross-sectional view of the middle trunk portion joined to the upper trunk portion of FIG. 16a;

FIG. 22 is an exploded perspective view of a modular lighting system having a connector assembly and top connector assembly according to an embodiment of the present invention;

FIG. 23 is an enlarged exploded perspective view of the connector assembly of FIG. 22;

FIG. 24 is an exploded perspective view of the top connector assembly of FIG. 22;

Figure 1:
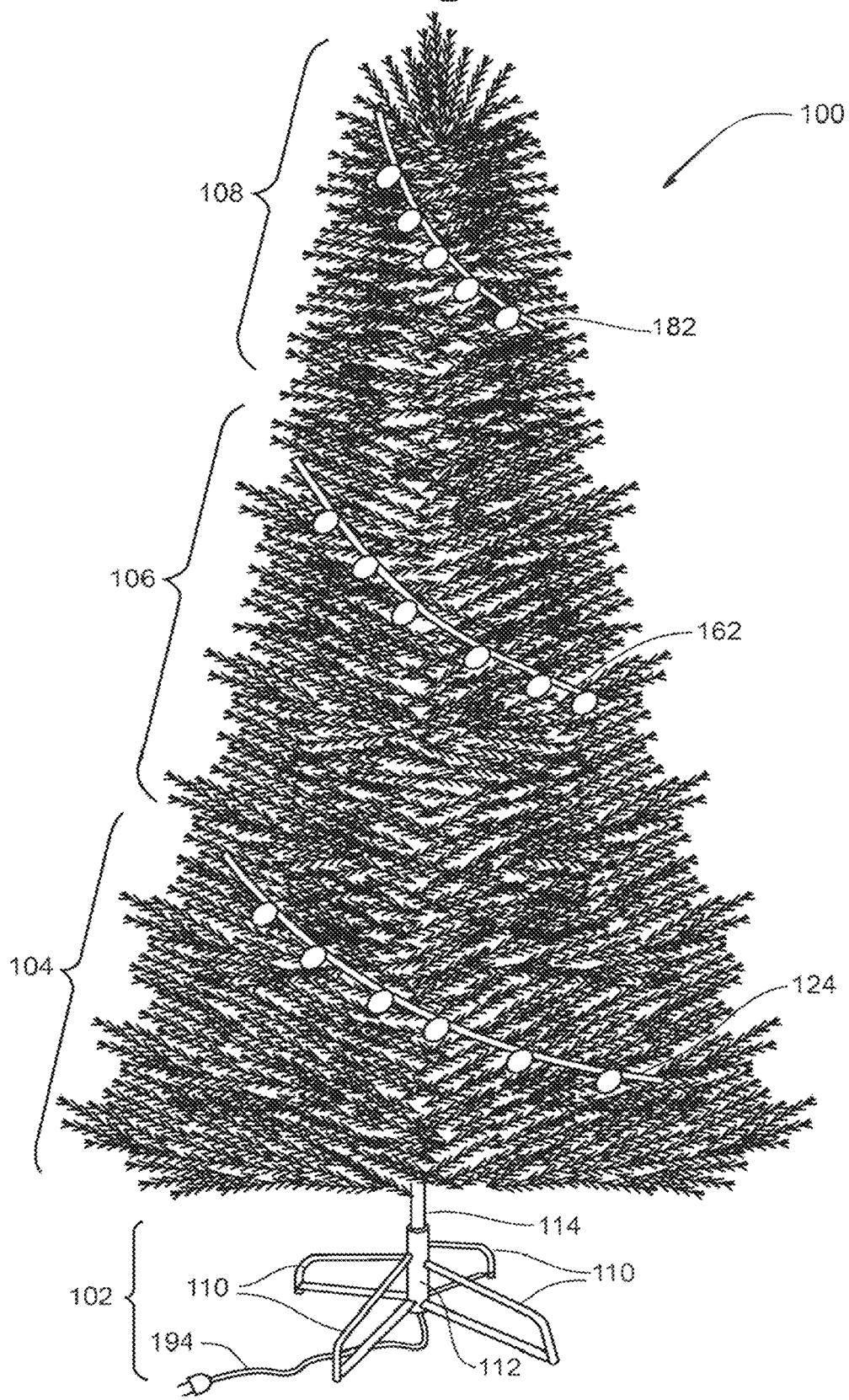
FIG. 1 is a front perspective view of a modular, lighted artificial tree, according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Referring to FIG. 1, an embodiment of modular lighted tree 100 of the present invention is depicted. Modular tree 100 includes base portion 102, first lighted tree portion 104, second lighted tree portion 106, and third lighted tree portion 108. In some embodiments, modular tree 100 may include more lighted tree portions, such as a fourth lighted tree portion, or may include fewer lighted tree portions. When tree 100 is assembled, as depicted, lighted tree portions 104, 106, and 108 are aligned along a common vertical axis A and held in a generally vertical orientation by base portion 102.

Base portion 102 as depicted includes multiple legs 110 connected to a central trunk-support portion 112. As depicted, trunk support portion 112 may be generally cylindrical to receive and support first tree portion 104. Base portion 102 may include an optional base-trunk portion 114 extending upwardly from trunk support portion 112 to form a portion of a trunk of tree 100. In other embodiments, base portion 102 may comprise other configurations capable of supporting and aligning tree portions 104, 106, and 108 in a steady, upright manner. Such alternate embodiments include a base portion having more or fewer legs 110, an integrated structure with an opening for receiving first lighted tree portion 104, and other such embodiments.

Figure 2:
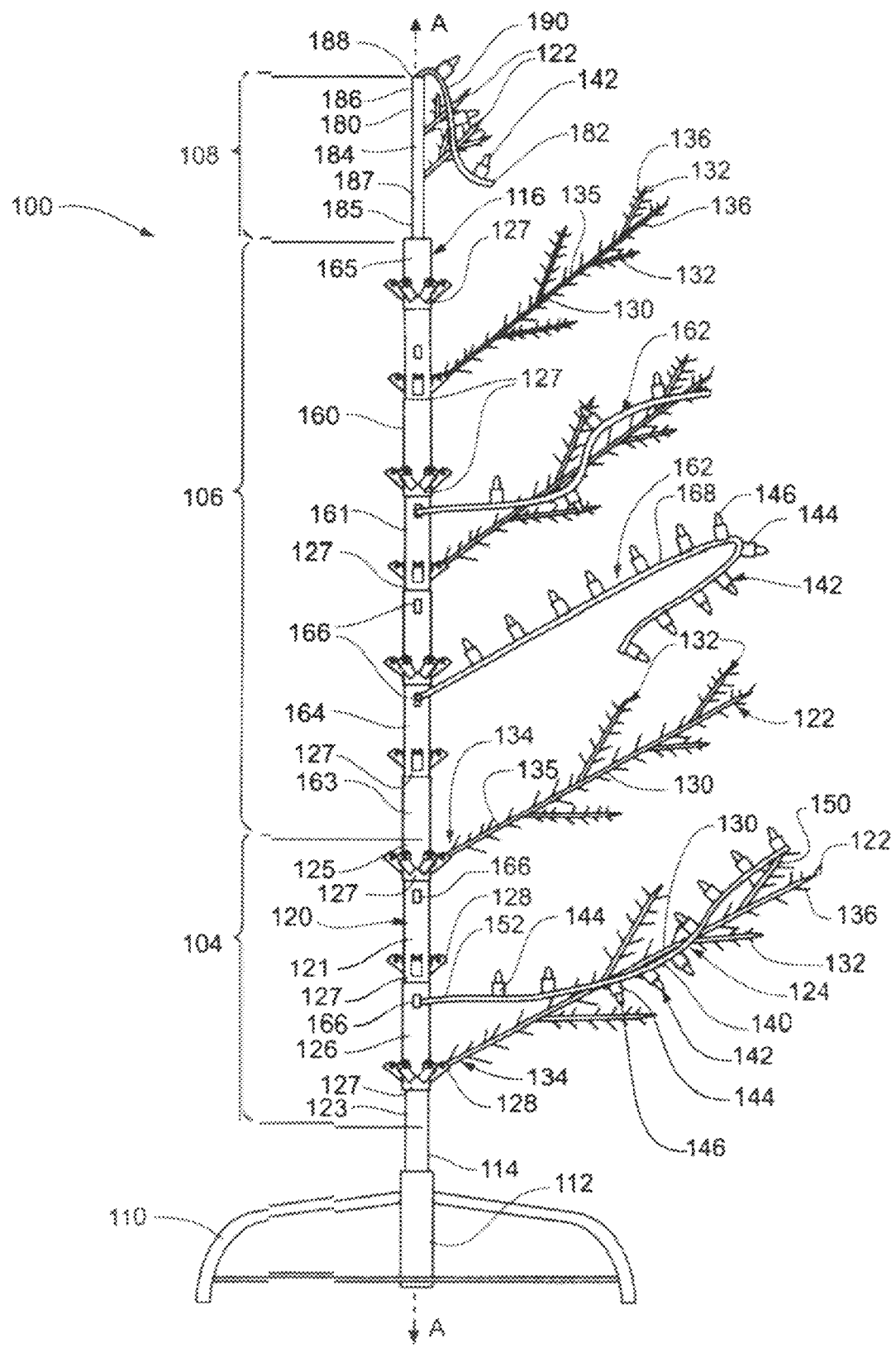
FIG. 2 is a front view of a base and trunk assembly of the tree of FIG. 1.

Referring also to FIG. 2, modular tree 100 is depicted in an assembled configuration, with multiple branches and light strings removed for illustrative purposes.

As depicted, first lighted tree portion 104 includes first trunk portion 120, multiple branches 122, and one or more first light strings 124.

First trunk portion 120 as depicted comprises a generally cylindrical, hollow structure including trunk portion body 121 having a lower end 123, an upper end 125, outside wall 126, and one or more branch-support rings 127. First trunk portion 120 also defines multiple openings 166 in wall 126.

Branch-support rings 127 include multiple branch receivers 128 extending outwardly and away from trunk portion 120. In some embodiments, branch receivers 128 define a channel for receiving a trunk end of a branch 122.

Each branch 122 generally includes primary branch extension 130 and may also include multiple secondary branch extensions 132 extending away from branch extension 130. Branch 122 is connected to trunk portion 120 at a branch receiver 128 at trunk-end 134. In some embodiments, as depicted, branches 122 include strands 136 simulating the needles found on natural pine or coniferous trees. Strands 136 are attached to branch frame 135, which in some embodiments comprises a solid-core frame, such as a metal rod, wire, multiple twisted wires or rods, or similar such materials. In other embodiments, frame 135 may be hollow.

Trunk ends of branches 122 may be bent or otherwise formed to define a loop or circular opening such that trunk end 134 of branch 122 may be secured to branch receiver 128 by way of a pin (not depicted) extending through branch receiver 128 and the loop formed at trunk end 134 of branch 122. In this way, a branch 122 may be allowed to pivot about the pin and branch receiver 128, allowing tree portion 104 to collapse to a smaller envelope size for convenient storage.

First light string 124 includes light string wiring 140 and a plurality of lighting element assemblies 142. Each lighting assembly element 142 includes housing 144 and lighting element 146. Lighting elements 146 may comprise incandescent bulbs, light-emitting diodes, a combination thereof, or any of other known types of light-emitting elements.

Lighting elements 146 may be electrically connected in parallel, series, or a combination of series and parallel, as discussed further below with respect to FIGS. 18-20, to form a parallel-connected, series-connected, parallel-series connected, or series-parallel connected first light string 124.

First light string 124 is affixed to one or more branches 122 of lighted tree portion 104 via multiple clips 150. A proximal end 152 of light string 124 may be connected to outside wall 126 of first trunk portion 120 by a connector or clip as described further below, or may be inserted through an opening 166 in wall 126 into an interior space defined by first trunk portion 120.

In one embodiment, first lighted tree portion 104 includes a plurality of first light strings 124. Such first light strings 124 may be substantially the same, for example, a series-parallel connected light string having 100 lighting element assemblies 142. In other embodiments, first lighted tree portion 104 may include first light strings 124 having a particular configuration and other first light strings 124 having another, different configuration. For example, first light strings 124 located closer to base portion 102 may be longer in length with more light emitting assemblies 142, while first light strings 124 further from base portion 102 may be relatively shorter in length, with fewer light emitting assemblies 142. In other embodiments, first lighted tree portion 104 may include only a single light string 124.

Second lighted tree portion 106, adjacent first lighted tree portion 104, is similar to lighted tree portion 104 and includes second trunk portion 160, multiple branches 122 and one or more second light strings 162.

Second trunk portion 160 as depicted also comprises a generally cylindrical, hollow structure including trunk portion body 161 having a lower end 163, an upper end 165, outside wall 164, and one or more branch-support rings 127. First trunk portion 120 also defines multiple openings 166 in wall 164.

In one embodiment, trunk portion 160 may have a trunk diameter that is substantially equal to a trunk diameter of first trunk portion 120, while in other embodiments, may have a trunk diameter that is different from that of the first trunk portion. In one such embodiment, a trunk diameter of second trunk portion 160 is slightly less than a trunk diameter of first trunk portion 120 such that that trunk 116 has a somewhat tapered look.

Similar to first light strings 124, second light strings 162 may comprise any combination of series-connected or parallel-connected individual or groupings of lighting element assemblies 142.

Third lighted tree portion 108, adjacent to second lighted tree portion 106 includes third trunk portion 180, branches 122, and one or more third light strings 182. In some embodiments, such as the depicted embodiment, a diameter of third trunk portion 180 may be somewhat smaller in diameter than a diameter of second lighted tree portion 108. As depicted, third trunk portion 180 comprises a relatively smaller diameter pipe-like body portion 184 including lower end 185, upper end 186, trunk wall 187, and defining top opening 188 (see also FIGS. 3 and 4). Also as depicted, in some embodiments, third trunk portion 180 may also not include branch-support rings 127, as branches 122 of third lighted tree portion 108 may be somewhat shorter in length than branches 122 of second lighted tree sections 106 and may be directly connected to body portion 184 of third trunk portion 180.

Third light string 182 includes wiring 190 and multiple lighting element assemblies 142. Similar to first light strings 124, third light strings 182 may comprise any combination of series-connected or parallel-connected individual or groups of lighting element assemblies 142.

In the embodiment depicted, third light string 182 emerges from top opening 188 such that a portion of third light string 182 is within an interior space defined by third trunk portion 180. Alternatively, third light string 182 may be connected via an electrical connector at opening 188. In other embodiments, third light string is mechanically connected to trunk portion via a connector at wall 186 of third trunk portion 180, or may be received in part by an opening (not depicted) in wall 186. In yet other embodiments, third light string 182 may be an extension of second light string 162.

Figure 3:
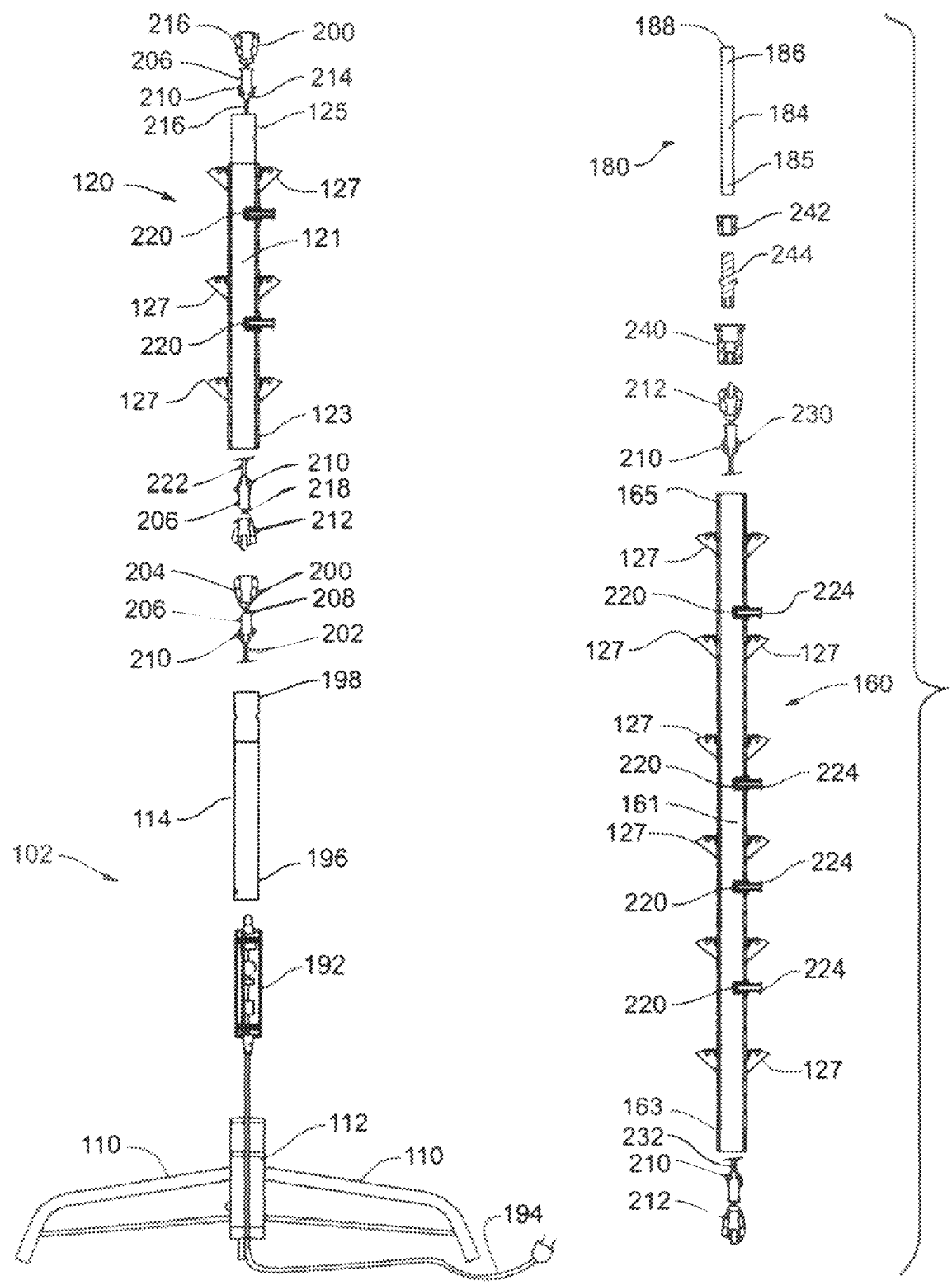
FIG. 3 is an exploded front view of the base and trunk assembly of FIG. 2.

Referring to FIG. 3, an exploded, cross-sectional view of base portion 102, and trunk portions 120, 160, and 180 is depicted.

In the embodiment depicted, base portion 102 includes an optional trunk-adapted power converter 192 which receives power from an external power source (not depicted) via power cord 194. Power converter 192 converts power from the external power source to a power appropriate for lighting strings 124, 162, and 182. In one embodiment, power converter 192 converts or transforms incoming alternating-current (AC) power to direct-current (DC) power. Such embodiments include converting from 120V AC to 9 VDC or 3 VDC for parallel or series-parallel construction and for use with, though not limited to, light elements 146 comprising LEDs.

Power converter 192, when present in tree 100, may be generally cylindrical in shape and sized to fit within a portion of either trunk-support portion 112 or base-trunk portion 114, or both. Known DC-powered light sets and known fiber optic lighted trees often include a power converter, but such power converters typically comprise block-like structures that plug directly into a power source, such as a 120V AC wall outlet. Not only are such known power converters unattractive, but may easily become dislodged from their power receptacle or outlet due to the significant weight of the converter. Tree 100 with power converter 192 of the present invention avoids such problems by securely locating the power converter within base portion 102.

In other embodiments, tree 100 may not include power converter 192, and light strings 124, 162, and 182 may utilize power from the external power source to energize lighting elements 146. In one such embodiment, all lighting elements 146 of tree 100 receive 120V AC power via a single power cord 194.

In the embodiment depicted in FIG. 3, base-trunk portion 114 includes first or lower end 196 and second or upper end 198. Lower end 196 may be sized to fit into trunk-support section 112.

Figure 4:
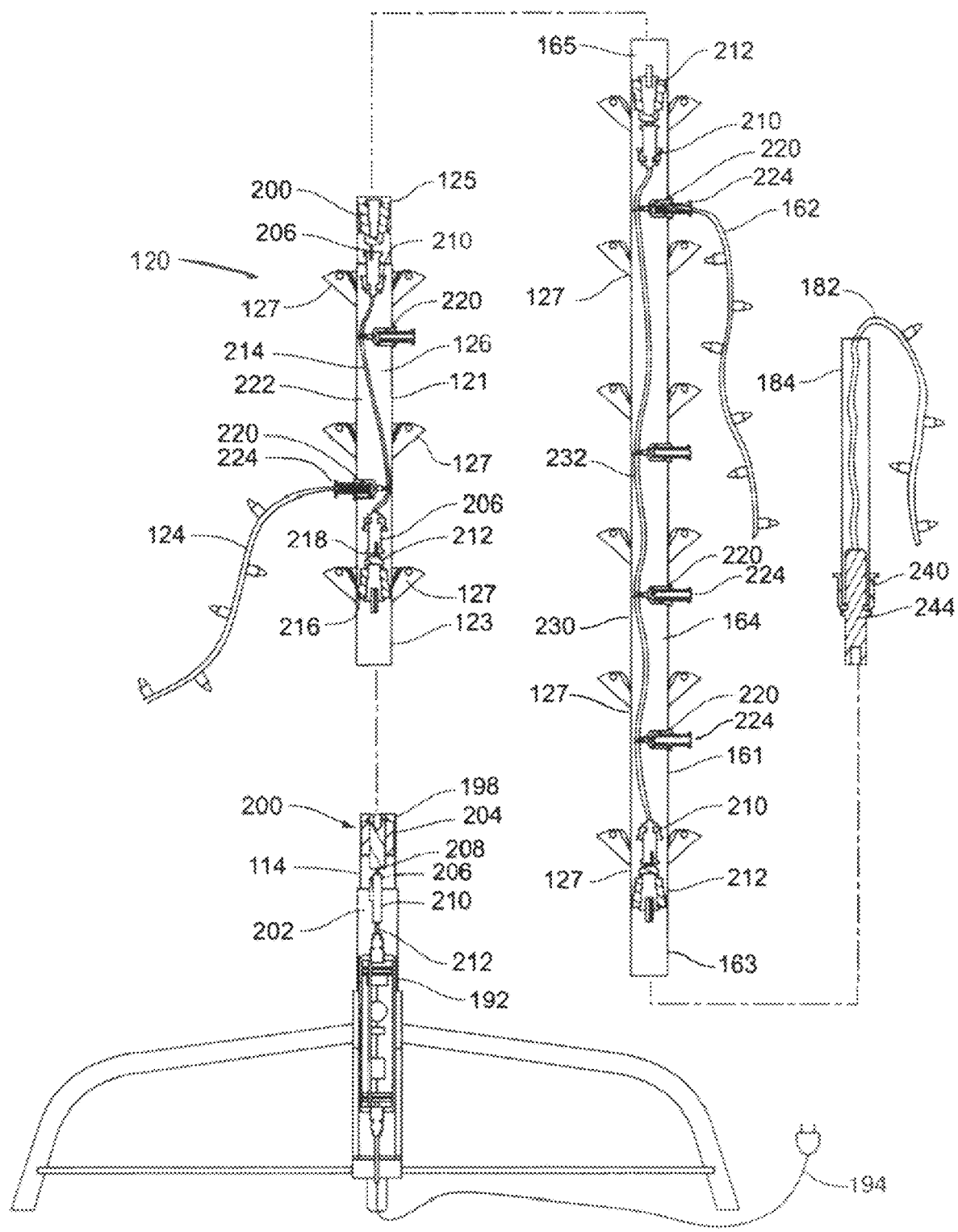
FIG. 4 is a cross-sectional view of a base and trunk portions with trunk connectors of the tree of FIG. 1.

Referring to FIGS. 2-4, base support portion 102 is configured to easily and securely mechanically couple and electrically connect to first tree portion 104; first tree portion 104 is configured to mechanically couple and electrically connect to second tree portion 106; and second tree portion 106 is configured to mechanically couple and electrically connect to third tree portion 108. As discussed further below, such mechanical and electrical connections are accomplished in part through a series of trunk connectors and wiring harnesses inserted into base 102 and trunk portions 120, 160 and 180.

Referring to FIGS. 3 and 4, in the embodiment depicted, base portion 102 houses trunk connector assembly 200 and base wiring harness 202. In one embodiment, such as the embodiment depicted, trunk connector assembly 200 is a female trunk connector configured to receive a male counterpart to form a coaxial-like electrical connection. Trunk connector assembly 200 is inserted into upper end 198 of base-trunk portion 114. Base wiring harness 202 when connected to trunk connector assembly 200 extends through a portion or all of the interior of base-trunk portion 114 and trunk support portion 112. As discussed further below with respect to FIGS. 5-7, trunk connector assembly 200 includes head assembly 204 coupled to electrical connector 206 via a length of wiring 208.

Base wiring harness 202 includes electrical connector 206 and power cord 194. In embodiments that include power converter 192, such as the embodiment depicted, base wiring harness 202 may also include additional wiring 212 and power converter 192.

Consequently, when assembled, trunk connector assembly 200 is electrically connected to a plug end of power cord 194 through base wiring harness 202 such that power is available at connector assembly 200 when tree 100 is plugged into a power source.

First trunk portion 120 houses trunk connector assembly 212, another trunk connector 200 and first trunk wiring harness 214. In one embodiment, such as the embodiment depicted, trunk connector assembly 212 is a male trunk connector configured to be inserted into a female counterpart, such as connector assembly 204 to form a coaxial-like electrical connection. Trunk connector assembly 212 is inserted into lower end 123 of first trunk body 121. Trunk connector assembly 200 is inserted into upper end 125 of first trunk body 121. First trunk wiring harness 214 when connected to trunk connector assemblies 200 and 212 extends through a portion, or all, of the interior of first trunk portion 120. As discussed further below with respect to FIGS. 8-10, trunk connector assembly 212 includes head assembly 216 coupled to electrical connector 206 via a length of wiring 218.

First trunk wiring harness 214 includes an electrical connector 210 coupled to connector assembly 200 at electrical connector 206, an electrical connector 210 coupled to connector assembly 212 at electrical connector 206, a plurality of optional wall mount connectors 220, and wiring 222. Embodiments of first trunk wiring harness 214 are described in further detail below with respect to FIG. 17.

In one embodiment, wall mount connectors 220 mount to wall 126 through openings 166 such that a portion of connector 220 is inside first trunk body 121, and a portion outside first trunk body 121. Wall mount connectors 220 are configured to mechanically and electrically connect to first light strings 124. In one embodiment, each first light string 124 includes a connector 224 that mates with wall mount connector 220 to detachably fix light string 124 to first trunk body 161 and first trunk wiring harness 214. In one embodiment, connector pair 220 and 224 may be easily connected or disconnected to attach or detach light string 124 to trunk portion 120.

Consequently, when assembled, trunk connector assembly 200 is electrically connected to connector assembly 212 and light strings 124 through wiring harness 214.

In the depicted embodiment, second trunk portion 160 houses a pair of trunk connector assemblies 212 and second trunk wiring harness 230. A lower trunk connector assembly 212 is inserted into lower end 163 of second trunk body 161. An upper trunk connector assembly 212 is inserted into upper end 165 of second trunk body 161. Second trunk wiring harness 230 when connected to trunk connector assemblies 212 extends through a portion, or all, of the interior of first trunk portion 160.

Second trunk wiring harness 230 may be generally similar to first trunk wiring harness 214, and includes an electrical connector 210 coupled to lower connector assembly 212 at electrical connector 206, an electrical connector 210 coupled to upper connector assembly 212 at electrical connector 206, a plurality of optional wall mount connectors 220, and wiring 232.

In one embodiment, wall mount connectors 220 mount to wall 164 through openings 166 such that a portion of connector 220 is inside second trunk body 161, and a portion outside second trunk body 161. Wall mount connectors 220 are configured to mechanically and electrically connect to second light strings 162. In one embodiment, each second light string 162 includes a connector 224 that mates with wall mount connector 220 to detachably fix light string 162 to second trunk body 161 and second trunk wiring harness 214. In one embodiment, connector pair 220 and 224 may be easily connected or disconnected to attach or detach light string 162 to trunk portion 160.

Consequently, when assembled, upper trunk connector assembly 212 is electrically connected to lower connector assembly 212 and light strings 162 through second trunk wiring harness 230.

Third trunk portion 180 in the depicted embodiment includes, in addition to trunk body portion 184, large adapter 240, small adapter 242, and trunk-top connector 244. Bottom end 185 of trunk body portion 184 fits into an upper opening of small adapter 242. As described further below with respect to FIGS. 16a and 16b, when assembled, a top portion of trunk-top connector 244 is received by a lower opening of small adapter 242, while a bottom portion of top connector 244 is received by large adapter 240 to securely connect third trunk portion 180 to second trunk portion 160.

As depicted, a bottom portion of trunk-top connector defines an electrical receiver for receiving a portion of trunk connector assembly 212 of second trunk portion 160. As such, third trunk portion 180 is in electrical connection with second trunk portion 160. Further, third light string 182 is electrically connected to trunk-top connector 244, thereby causing third light string 182 to be in electrical connection with second trunk wiring harness 230 and first trunk wiring harness 214, as well as in electrical connection to the various first and second light strings 124 and 162 via their respective wiring harnesses. Alternatively, third trunk portion 180 may include a separate third trunk wiring harness detachably connectable to one or more of third light strings 182. Details of the various embodiments of electrical circuits formed are described further below with respect to FIGS. 17-20.

Referring to FIGS. 5-7, an embodiment of connector 204 is depicted. FIG. 5 depicts an assembled connector 200, configured as a female connector, coupled to, or connected to a portion of a trunk wiring harness, such as a trunk wiring harness 214; FIG. 6 depicts an exploded view of connector 200 and a connector 210 of trunk wiring harness 214; and FIG. 7 depicts a top view of connector assembly 200.

As described above, an embodiment of connector assembly 200 includes head assembly 204, wiring 208, and connector 206. As depicted, connector assembly 200 comprises a female-style electrical connector, though in other embodiments may comprise other multi-contact electrical connectors as described further below.

Wiring 208 may include one or more wires comprising an insulated or uninsulated conductor. As depicted, wiring 208 of connector assembly 200 includes first wire 256 and second wire 258.

In an embodiment, head assembly 204 includes contact set 250, insert 252, and trunk plug 254. Contact set 250 as depicted includes a first electrical contact 260 and a second contact 262 and defines receptacle 264. In the embodiment depicted, first electrical contact 260 comprises a portion of outside surface of contact set 250 and an inside surface of contact set 250 and forms an electrical connection with first wire 256. Second electrical contact 262 forms an electrical connection with second wire 258, and may be located generally at a center portion of receptacle 264, extending upward and away from a closed end of receptacle 264.

Consequently, the depicted embodiment of contact set 250 comprises a coaxial electrical connector.

However, it will be understood that contact set 250 may include other types of single-contact or multi-contact electrical connectors. Such embodiments include first electrical contact 260 and second electrical contact 262 comprising a pair of electrical contacts of substantially the same structure, such as a pair of blade connectors, spade connectors, or other such electrical terminals or contacts as known to those skilled in the art.

When present, insert 252 may be comprised of a generally elongated, cylindrical structure having a body 264 defining an outside surface 266 and cavity 268, top end 270, bottom end 272, and flange 274 defining top surface 276. Cavity 268 may have a diameter appropriate for receiving contact set 250. In some embodiments, body 264 of insert 252 may be tapered. Although not intending to be limiting, insert 252 may comprise a plastic or similar non-conducting material.

Plug 254 comprises a generally cylindrical shape sized to be inserted into one of trunk portions 120 or 160, or base 102, and for securely positioning contact set 250 within its respective trunk or base portion. Plug 254 in an embodiment includes a top end 278, second end 280, left side 282, right side 284, one or more ribs 286 and top surface 288. Plug 254 defines cavity 290. Plug 254 may be tapered such that a plug diameter at bottom end 280 is somewhat smaller than a plug diameter at top end 278. In some embodiments, plug 254 may comprise a non-conductive plastic material with elastic properties allowing sides 282 and 284, and to a certain extent, ribs 286 to bend or flex slightly.

When assembled, contact set 250 is received into cavity 268 of insert 252, and insert 252 is received into cavity 290 of plug 254 such that flange 274 is adjacent top surface 288 of plug 254. For body-tapered embodiments of insert 252, as insert 252 is inserted into cavity 268, force is exerted onto contact set 250 such that plug 254, insert 252 and contact 250 are held together forming an interference fitment, thereby securing contact set 250 in head assembly 204.

Wiring 208 connects head assembly 204 to connector 206. Connector 206 defines one or more wire-receiving cavities 292 for securely receiving first wire 256 and second wire 258. In one embodiment, connector 206 couples with connector 210 of a trunk wiring harness. In such an embodiment, connectors 206 and 210 bring wiring 208 into contact with wiring 222, such that a conductor of wire 256 is in electrical connection with a conductor of wire 294 and a conductor of wire 258 is in electrical connection with a conductor of wire 296. In some embodiments, connector 206 detachably locks to connector 210.

Referring to FIGS. 8-10, an embodiment of connector 212 is depicted. FIG. 8 depicts an assembled connector 212, configured as a male connector, coupled to, or connected to a portion of a trunk wiring harness, such as a trunk wiring harness 214; FIG. 9 depicts an exploded view of connector 212 and a connector 210 of trunk wiring harness 214; and FIG. 10 depicts a top view of connector assembly 212.

As described above, an embodiment of connector assembly 212 includes head assembly 216, wiring 218, and connector 206. As depicted, connector assembly 212 comprises a male-style electrical connector, though in other embodiments may comprise other multi-contact electrical connectors as described further below.

Wiring 218 may include one or more wires comprising an insulated or uninsulated conductor. As depicted, wiring 218 of connector assembly 212 includes first wire 298 and second wire 300.

In an embodiment, head assembly 216 includes contact set 302, insert 304, and trunk plug 254. Contact set 302 as depicted includes a first electrical contact 306 and a second contact 308 and defines receptacle 310. In the embodiment depicted, first electrical contact 306 comprises a portion of outside surface of contact set 302 and forms an electrical connection with first wire 298. Second electrical contact 308 forms an electrical connection with second wire 300, and may be located generally at a center, bottom portion of receptacle 310. Consequently, the depicted embodiment of contact set 302 comprises a coaxial electrical connector.

However, it will be understood that contact set 302 may include other types of single-contact or multi-contact electrical connectors. Such embodiments include first electrical contact 306 and second electrical contact 308 comprising a pair of electrical contacts of substantially the same structure, such as a pair of blade connectors, spade connectors, or other such electrical terminals, receivers, or contacts as known to those skilled in the art.

When present, insert 304 may be comprised of a generally elongated, cylindrical structure having a body 312 defining an outside surface 314 and cavity 316, top end 318, bottom end 320, and flange 322 defining top surface 324. Cavity 316 may have a diameter appropriate for receiving contact set 302. In some embodiments, body 312 of insert 304 may be tapered. Although not intending to be limiting, insert 304 may comprise a plastic or similar non-conducting material.

When assembled, contact set 302 is received into cavity 316 of insert 304, and insert 304 is received into cavity 290 of plug 254 such that flange 322 is adjacent top surface 288 of plug 254. For body-tapered embodiments of insert 304, as insert 304 is inserted into cavity 268, force is exerted onto contact set 302 such that plug 254, insert 304 and contact set 304 are held together forming an interference fitment, thereby securing contact set 304 in head assembly 216.

Wiring 218 connects head assembly 216 to connector 206. Connector 206 defines one or more wire-receiving cavities 292 for securely receiving first wire 298 and second wire 300. In one embodiment, connector 206 couples with connector 210 of a trunk wiring harness. In such an embodiment, connectors 206 and 210 bring wiring 218 into contact with wiring 222, such that a conductor of wire 298 is in electrical connection with a conductor of wire 294 and a conductor of wire 300 is in electrical connection with a conductor of wire 296. In some embodiments, connector 206 detachably locks to connector 210.

Referring to FIGS. 11-13, an embodiment of trunk-top connector 244 is depicted. FIG. 11 depicts trunk-top connector 244 as assembled; FIG. 12 depicts trunk-top connector in exploded view; and FIG. 13 depicts a bottom view of assembled trunk-top connector 244.

In the depicted embodiment, trunk-top connector 244 includes a body portion 330 and dual-wire contact set 250.

Body portion 330 includes top portion 332 and bottom portion 334. Top portion 332 and bottom portion 334 together may comprise an integrated body portion 330, or may comprise separate and distinct pieces such that body portion 330 comprises an assembly. In one embodiment, bottom portion 334 is substantially the same as adapter 252. Although depicted as a generally cylindrical shape with a circular cross-section, body portion 330 may take other shapes adapted to couple with trunk body 184, such as square or rectangular, as needed.

Top portion 330 may include a plurality of vertical ribs 336 distributed about a perimeter of top portion 330. A top portion of each rib 336 may be angled inward to aid in guiding top portion 330 into trunk body 184 during assembly.

Bottom portion 334 includes flange 338 and defining cavity 340. In some embodiments, bottom portion 334 may be slightly tapered such that bottom portion 334 has an upper diameter somewhat larger than a lower diameter so as to assist in forming an interference fit with adapter 240 (refer also to FIG. 3). Flange 338 includes a bottom surface 342 and a top surface 344. Contact set 250 as described above in further detail is sized to fit into cavity 340 of bottom portion 334, and is in electrical connection with wires 344 and 346. Wires 344 and 346 may comprise a portion of light set 182, or may be part of a separate, and in some embodiments, detachably-connected, trunk-top wiring harness configured to electrically connect contact set 250 with light set 182.

Figure 14C:
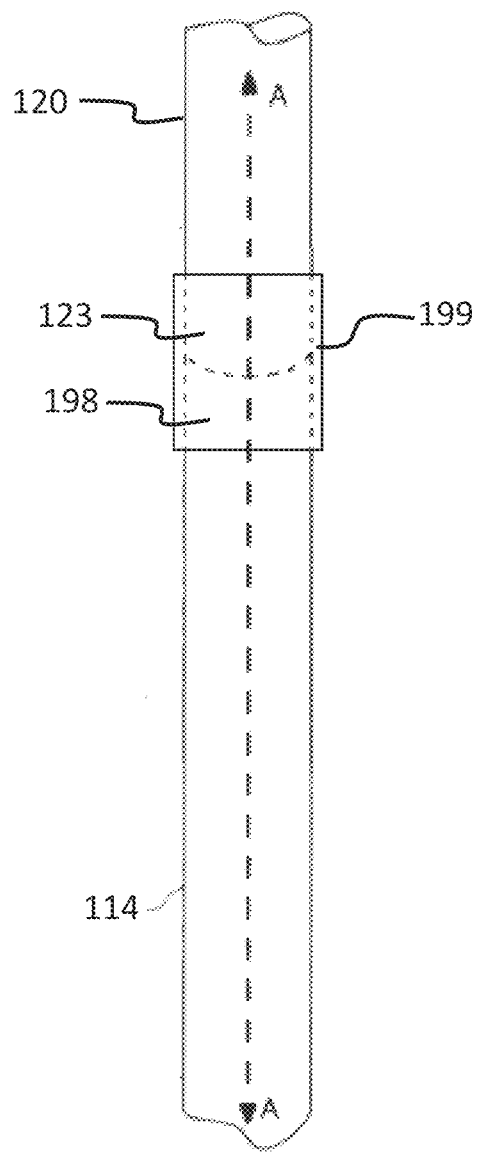
FIG. 14c is a front view of an end of a first tree portion joined to an end of a second trunk portion via a sleeve.

Referring primarily to FIGS. 14a and 14b, and secondarily to FIGS. 3 and 4, a coupling of base-trunk portion 114 of base portion 102 with trunk portion 120 is depicted. FIG. 14a depicts the portions coupled together along a common vertical axis A, while FIG. 14b depicts the portions coupled together, with cross-sectional views of base-trunk portion 114 and trunk body 121.

Base portion 102 may be mechanically coupled and electrically connected to trunk portion 120 by simply aligning upper end 198 of base-trunk portion 114 with lower end 123 of trunk body 121 along axis A and inserting upper end 198 into lower end 123. In the depicted embodiment, to form the mechanical coupling and electrical connection between base portion 102 and trunk portion 120, it is not necessary to rotate either portion about axis A.

From a mechanical standpoint, as described above, upper end 198 of base-trunk portion 114 has an outside diameter that is slightly less than an inside diameter of lower end 123 of trunk body 121, such that upper end can be inserted into lower end 123, causing a trunk wall 126 to overlap with a trunk wall 350 of base-trunk portion such that a portion of the walls may be adjacent one another. When upper end 198 is inserted fully into lower end 123, or in other words, when lower end 123 is lowered fully onto upper end 198, lower end 123 seats firmly against base-trunk portion 114 at an angled region of transition 352 between upper end 198 and lower end 196 of base-trunk portion 114.

At angled region of transition 352, an outside diameter of base-trunk portion 114 transitions from a relatively smaller outside diameter of upper portion 198 to a relatively larger outside diameter of lower end 196. In one embodiment, the larger outside diameter of lower end 196 is approximately the same outside diameter as lower end 123. When base-trunk portion 114 and first trunk body 121 are generally cylindrical with a circular cross section as depicted, region of transition 352 comprises a generally circular region about the perimeter of base-trunk portion 114. The angle formed by region of transition 352 relative to a horizontal plane perpendicular to base-trunk portion 114 may vary from 0 degrees to substantially 90 degrees, though as depicted, an angle of region of transition 352 may range from 30 degrees to 60 degrees.

When seated, the weight of trunk portion 120 exerts a downward force onto base-trunk portion 114 creating an interference fit between lower end 123 and upper end 198, thereby mechanically coupling base portion 102 to first trunk portion 120 and first tree portion 104. Unlike typical lighted trees having multiple trunk sections, tree 100 of the present invention does not require that base or trunk portions be aligned in any particular matter, except along axis A.

Known lighted trees having multiple tree or trunk portions generally require that after aligning the trunk portions along a vertical axis, a trunk portion must be rotated about the vertical axis to complete the mechanical connection between trunk portions. Embodiments of tree 100 of the present invention provide simplified structures and methods for mechanically coupling tree portions along the trunk without the burden of multiple steps such as rotational alignment or affixing external fasteners such as screws, bolts or pins.

It will be understood that the above embodiment for mechanically coupling base portion 102 to tree portion 104 is not intended to be limiting. In other embodiments, lower end 123 may comprise an outer diameter smaller than upper end 198 such that lower end 123 inserts into upper end 198, rather than vice versa. In yet other embodiments, and referring also to FIG. 14c, trunk portion 120 couples with base-trunk body 114 via other structure integrated with, or separate from, base portion 102 or tree portion 104. In one such embodiment, a sleeve 199 attached to upper end 198 forms a receiving cavity for lower end 123 such that lower end 123 may be inserted into the sleeve 199 to join the two portions. In such an embodiment, trunk diameters might be substantially equal. In another embodiment requiring only minimal rotational alignment, lower end 123 and upper end 198 may comprise other shapes at their ends, such as a square, leaving four coupling positions about axis A.

When lower end 123 is seated against upper end 198, in addition to the mechanical coupling at the walls of the trunk portions, connector assemblies 200 and 212 form an additional mechanical coupling of base portion 102 and trunk portion 120.

During assembly of base portion 102, plug 254 of connector assembly 200 is inserted into upper end 198 of base-trunk portion 114. In an embodiment, plug 254 is tapered such that top end 278 has a larger diameter than bottom end 280. Top end 278 may also have a slightly larger diameter than an inside diameter of base-trunk portion 114, while bottom end 280 has a slightly smaller diameter than an inside diameter of base-trunk portion 114. As such, when plug 254 is inserted into base-trunk portion 114, portions of plug 254, including sides 280 and 282 and ribs 286 contact an inside surface of trunk wall 350 of base-trunk portion 114. Sides 280, 282, and to a certain extent, ribs 286 deform in order to fit plug 254 inside base-trunk portion 114. Such deformation or compression of plug 254 seats the plug securely within base-trunk portion 114, forming a compression or interference fit with portion 114. As such, plug 254 is unlikely to move along vertical axis A or rotationally about vertical axis A when a user of tree 100 couples base portion 102 and trunk portion 120 together.

Similarly, connector assembly 212 is secured within lower end 123 of trunk body 121 of trunk portion 120, with plug 254 wedged tightly into place.

Further, connector assemblies 200 and 212 are securely positioned within their respective trunk sections such that when base portion 102 is coupled with trunk portion 120, portions of connector assembly 200 and connector assembly 212 come into contact, thus forming a mechanical coupling of the connector assemblies. More specifically, the portion of contact set 302 extending beyond top surface 324 of flange 322 of connector assembly 212 is inserted into cavity 264 of contact set 260 of connector assembly 200 (see also FIGS. 5, 6, 8, and 9). Contact 262 of contact set 250 is inserted into cavity 310 of contact set 302. Top surface 324 of flange 322 may also contact adapter 252.

These multiple points of mechanical contact between connector assemblies 200 and 212 combined with the secure fit of connector assemblies 200 and 212 to the trunk portions via plugs 254 creates a substantial mechanical coupling not only at the trunk walls, but also at the inside, center portions of base portion 102 and trunk portion 120. The deformation of plugs 254 asserting an outward force on the trunk portions along with the mechanical coupling of the connector assemblies reduces the likelihood of the shifting of connector assemblies 200 and 212, as is discussed further below.

The plug fitment and coupling of connector assemblies 200 and 212 also provides some additional structural support to the generally hollow base-trunk portion 114 and first trunk-body portion 121. As the weight of each tree portion 104, 106, and 108 may be substantial, any force transverse to axis A has potential to degrade or deform the trunk walls. Such force may be distributed to plugs 254 through the walls to lessen the detrimental impact of any such forces.

In addition to the mechanical coupling of base portion 102 and lighted tree portion 104, when base portion 102 is coupled to lighted tree portion 104 the two portions become electrically connected. As discussed above, when connector assembly 212 is coupled to connector assembly 200, contact set 250 is inserted into cavity 264 of contact set 260 of connector assembly 200. Contact 262 of contact set 250 is inserted into cavity 310 of contact set 302. Consequently, an electrical connection is made between contact 260 of connector assembly 200 and contact 306 of connector assembly 212, thus electrically connecting wires 256 and 298. An electrical connection is also made between contact 262 of connector assembly 200 and contact 308 of connector assembly 212, thus electrically connecting wires 258 and 300.

In one embodiment, the coaxial nature of connectors 200 and 212 permit the electrical connection of the connectors at any rotational orientation about a vertical axis. Therefore, when a user assembles base portion 102 to tree portion 104, other than aligning the two portions along a vertical axis A, no rotational alignment is necessary. Thus, when a user assembles tree 100, there is no need to rotate or reposition a particular tree portion after lifting it up and before placing it onto a base portion. A user simply aligns the trunk portion with the base portion or other trunk portion along a vertical axis and brings the trunk portion downward to couple with the stationary base or trunk portion, thus mechanically coupling and electrically connecting the tree portions. If some rotation occurs inadvertently, the coupling and connection still occurs, regardless of the rotation.

Referring to FIGS. 15a and 15b, as well as FIGS. 3-10, a coupling of first trunk portion 120 with second trunk portion 160 is depicted. The mechanical coupling and electrical connection of first trunk portion 120 with second trunk portion 160 is substantially similar to the coupling and connection of trunk portion 114 of base portion 102 with trunk portion 120 as described above with respect to FIGS. 14a and 14b. FIG. 15a depicts first trunk portion 120 and upper end 125 of first trunk body 121 coupled together with second trunk portion 160 and lower end 163 of second trunk body 161, along a common vertical axis A. FIG. 15b depicts the portions coupled together, including connectors, with cross-sectional views of first trunk body 121 and second trunk body 161.

When mechanically coupled, upper end 125 of first trunk body 121 fits into lower end 163 of second trunk body 161, forming a fit between the two trunk bodies, substantially similar to the fit described above with reference to end 198 of base-trunk portion 114 and end 123 of first trunk body 121. Further, connector assembly 200 mechanically couples and electrically connects with connector assembly 212 in a manner described above.

Consequently, when trunk portions 120 and 160 are joined, first trunk wiring harness 222, already in electrical connection with connector assembly 200, becomes electrically connected with second trunk wiring harness 230 via connector assembly 212.

FIGS. 15a and 15b also depict first trunk wiring harness 214 connected at connector 206 to connector assembly 200 and to trunk body 161 at wall 126. A connector 224 of light string 124 connects light string 124 and its lighting elements 146 to first trunk wiring harness 214 and consequently to connector assembly 200.

Referring to FIGS. 16a and 16b, as well as FIGS. 3, 4, and 8-13, a coupling of second trunk portion 160 with third trunk portion 180 is depicted. Generally, a lower end of third trunk portion 180 is inserted into an upper end of second trunk portion 160 to form the mechanical coupling and electrical connection between the two portions.

In the embodiment depicted, top portion 332 of body portion 330 of trunk-top connector 244 is inserted through small adapter 242 and into third trunk body 184 at lower end 185. Vertical ribs 336 contact an inside surface of trunk body 184 to securely hold connector 244 to trunk body 184. An inside surface of small adapter 242 contacts an outside surface of body 184. Contact set 250 (not depicted in FIGS. 16a and 16b) is located in bottom end 334 of connector body portion 330. Wires 334 and 336 extend away from connector 244 and into the interior of trunk body 184. Small adapter 242 and body portion 330 are inserted into large adapter 240. Bottom end 334 of body 330 extends through an opening in large adapter 240. Third trunk portion 180 is inserted into end 165 of trunk body portion 161.

Connector assembly 212 located in end 165 of trunk body portion 161 couples with trunk-top connector 244. When fully engaged, bottom end 334 of connector 244 engages plug 254, or in some embodiments engages top surface 324 of adapter 304 of connector assembly 212. Contact set 302 is received into bottom end 334 of body 300. Consequently, a secondary mechanical coupling between connector assembly 212 and connector assembly 244, and between trunk portions 160 and 180, is formed.

When mechanically coupled, connectors 212 and 244 form an electrical connection between second trunk portion 160 and third trunk portion 180. Similar to the electrical connection described with respect to connectors 212 and 200, contact set 320 engages with contact set 250 to form an electrical connection between connectors 212 and 244, and thusly between second trunk wiring harness 232 and connector assembly 244, including wires 344 and 346. Further details regarding the electrical circuits formed by the electrical connections between trunk portions and their respective trunk connectors are described below with respect to FIGS. 17-20.

Figure 17:
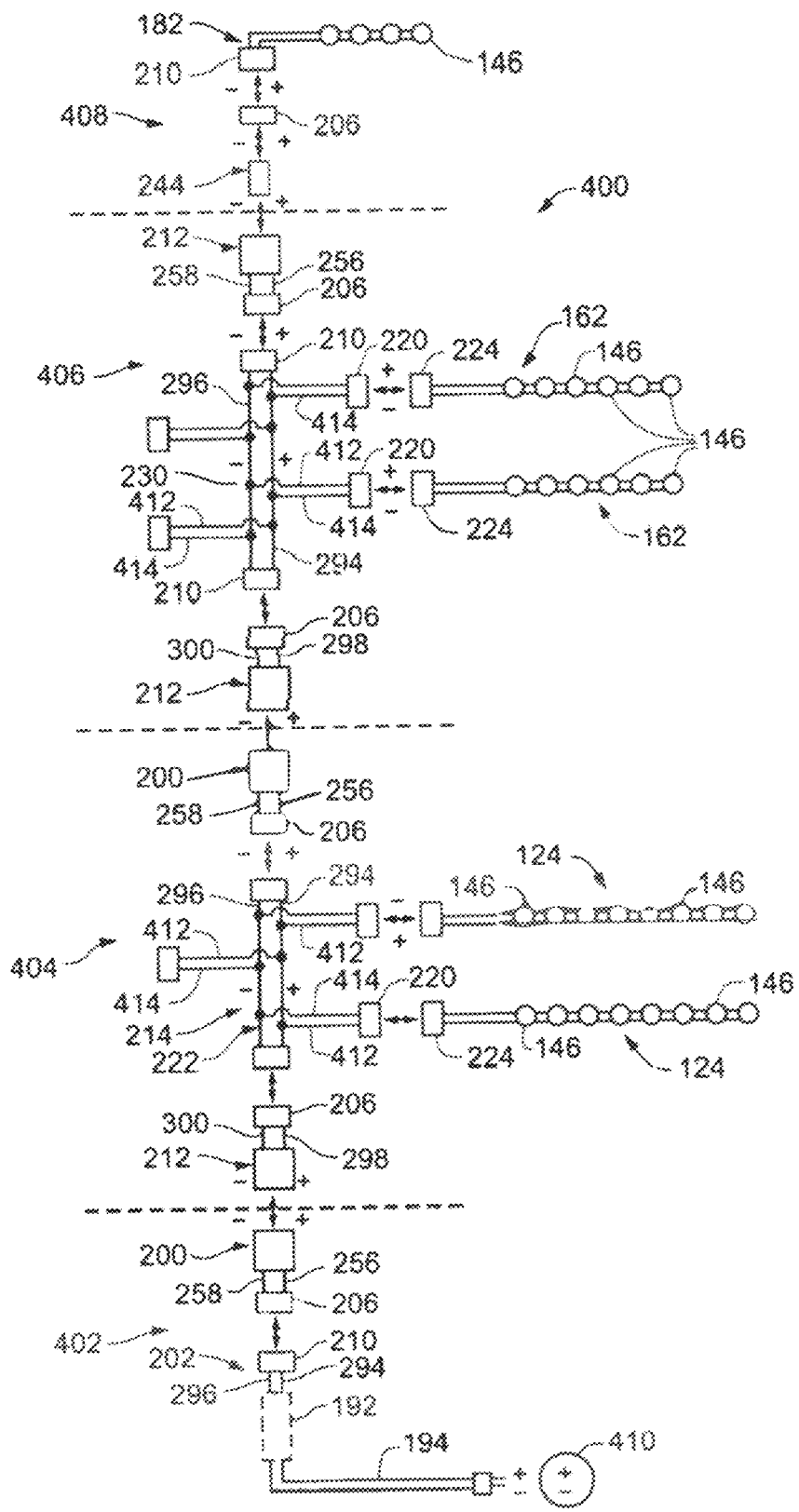
FIG. 17 is a block diagram of a modular tree lighting system, according to an embodiment of the present invention.

Referring to FIG. 17, a block diagram of an embodiment of modular lighting system 400 of tree 100 comprising the various electrically-relevant components discussed above is depicted. Lighting system 400 includes base lighting subsystem 402, first tree portion lighting subsystem 404, second tree portion lighting subsystem 406, and third tree portion lighting subsystem 406. Throughout FIG. 17, the symbols "+" and "−" are used to indicate an example electrical polarity and to indicate electrical connection or continuity between wires and connectors. It will be understood that these polarity indicators while useful for teaching the present invention are not intended to limit the invention to a particular polarity configuration, or in any way limit the invention only to DC operation.

Base lighting subsystem 402 includes connector assembly 200, wiring harness 202, optional power converter 192, and power cord 194. In the embodiment depicted, connector 200 is detachably connected to wiring harness 202. In one such embodiment, connector 206 mates with connector 210 to connect wire 294 to wire 256 and wire 296 to wire 258. In embodiments not including power converter 192, power cord 194 may connect directly to connector 210 such that power cord 194 is detachably coupled to connector assembly 200. Other embodiments may not include connectors 206 and 210, such that power cord 194 is integrated into connector 200. When power cord 194 is connected to a power source 410, power is consequently available at connector assembly 200.

Because of the modularity and detachability of connector assembly 200 and wiring harness 202, connector assembly 200 may be used universally with a variety of wiring harnesses 202 and power cord 194 configurations.

First tree lighting subsystem 404 includes connector assembly 212, first trunk wiring harness 214, first light strings 124 and connector assembly 200. In an embodiment, connector assemblies 212 and 200 are detachably connected to first trunk wiring harness 214 via connectors 206 and 210. In this manner, any number of different first trunk wiring harnesses 214 may be used to create lighting subsystem 404. In the embodiment depicted, first trunk wiring harness 214 includes three connectors 210 for connecting to three light strings 124. If a particular tree portion 104 requires more or fewer light strings 124, based on tree size, light count, and so on, a different wiring harness 214 may be used to comprise subsystem 404.

First trunk wiring harness 214 also includes wiring 222, which comprises first bus wire 294, second bus wire 296, and a plurality of light string connection wires 412 and 414. Light string connection wires 412 and 414 electrically connect first light strings 124 to first trunk wiring harness 214. In some embodiments, bus wires 294 and 296 may be a higher or heavier gauge wire, such as 20AWG, while light string connection wires 412 and 414 may be a lighter gauge wire, such as 22AWG. The connection between any of bus wires 294 and 296 and wires 412 and 414 may be made by soldering, crimping, connecting using wire connectors, or otherwise causing the wires to be in electrical contact with one another, as is known in the art.

Second tree lighting subsystem 406 includes a pair of connector assemblies 212, second trunk wiring harness 230, and second light strings 162. In an alternate embodiment, second tree lighting subsystem 406 includes a pair of connector assemblies 200, or one connector assembly 200 and one connector assembly 212, rather than a pair of connector assemblies 212.

As depicted, connector assemblies 212 are detachably connected to second trunk wiring harness 230 via connectors 206 and 210. In this manner, any number of different second trunk wiring harnesses 230 may be used to create lighting subsystem 406. In the embodiment depicted, second trunk wiring harness 230 includes four connectors 210 for connecting to four light strings 162. Similar to first trunk wiring harness 214 as described above, if a particular tree portion 104 requires more or fewer light strings 162, based on tree size, light count, and so on, a different wiring harness 214 may be used to comprise subsystem 404.

Second trunk wiring harness 230 also includes wiring 232, which comprises first bus wire 294, second bus wire 296, and a plurality of light string connection wires 412 and 414. Light string connection wires 412 and 414 electrically connect first light strings 162 to first trunk wiring harness 232.

When second trunk portion 180 is coupled and connected to first trunk portion 160, which is connected to base portion 102, second trunk wiring harness is in electrical communication with first trunk wiring harness 214, and base wiring harness 202. Consequently, second light strings 162 are in electrical communication with first light strings 124 via first and second trunk wiring harnesses 214 and 230.

Third tree lighting subsystem 408 includes connector assembly 244, one or more light strings 182, and in some embodiments, a pair of connectors 206, 210 for detachably connecting light string 182 to connector 244. When third trunk body 180 is coupled and connected to second trunk body 160, connector 244 makes electrical connection with connector assembly 212, such that light string 182 is electrically connected to second trunk wiring harness 230.

Thus, when base portion 102 is coupled and connected to trunk portions 120, 160, and 180, wiring harnesses 202, 214, 230 and light strings 124, 162, and 182 are all electrically connected to one another, directly, or indirectly. When power cord 194 is plugged into, or otherwise electrically connected to, power source 410, power is available throughout modular lighting system 400, thus powering lighting elements 146.

As discussed briefly above, the modularity of lighting system 400 provides a number of benefits for manufacturers and users of tree 100. From a manufacturing standpoint, as the number of light strings increases or decreases for various lighted trees 100, wiring harnesses 214 or 230 can be interchanged or modified while still using common modular connector assemblies 200, 212, and 244. Further, when modular light sets 124, 162, and 182 having connectors 224 that connect to connectors 220 at trunk 116, light sets with more or fewer lighting elements 146 may be clipped on to trunk 116 via the connector pair 220 and 224, without necessarily changing trunk wiring harnesses (though in some cases, heavier gauge wiring may be necessary).

From a user perspective, the modularity of individual light strings 124, 162, and 182 offers a user the opportunity to easily disconnect the light string from trunk 116 for replacement as needed.

Although embodiments of tree 100 include modular lighting system 400, it will be understood that although tree 100 may generally be considered a modular tree mechanically coupled and electrically connected at its respective trunk portions, in some embodiments, the lighting system of modular lighted tree 100 may not include a fully modular lighting system 400. In such alternate embodiments, a lighting system of the present invention may not include detachable light strings 124, 162, 182, or may not include detachable trunk wiring harnesses.

Figure 18:
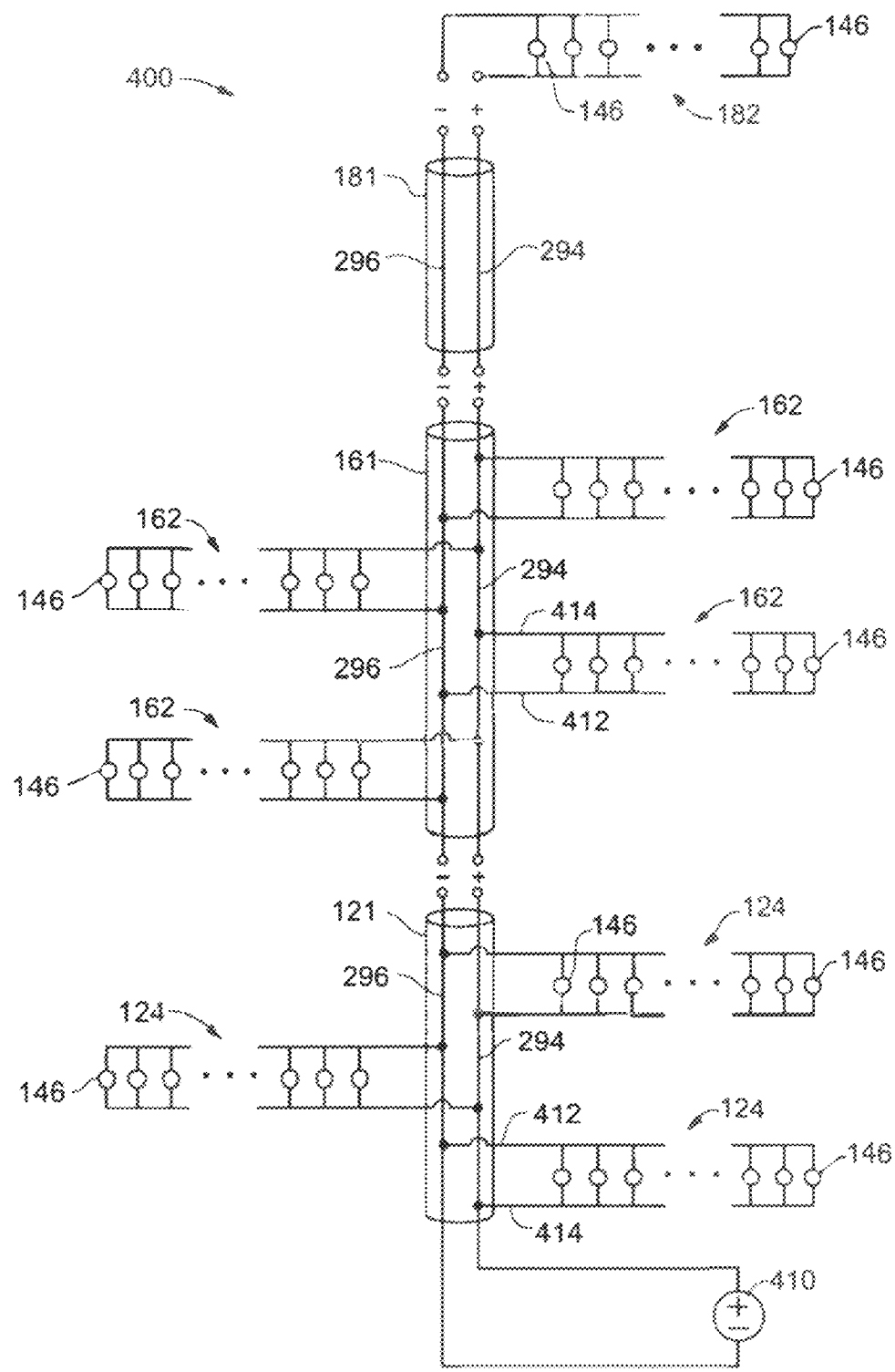
FIG. 18 is an electrical circuit diagram of the modular lighting system depicted in FIG. 17, with light strings having parallel-connected lighting elements, according to an embodiment of the present invention.
Figure 19:
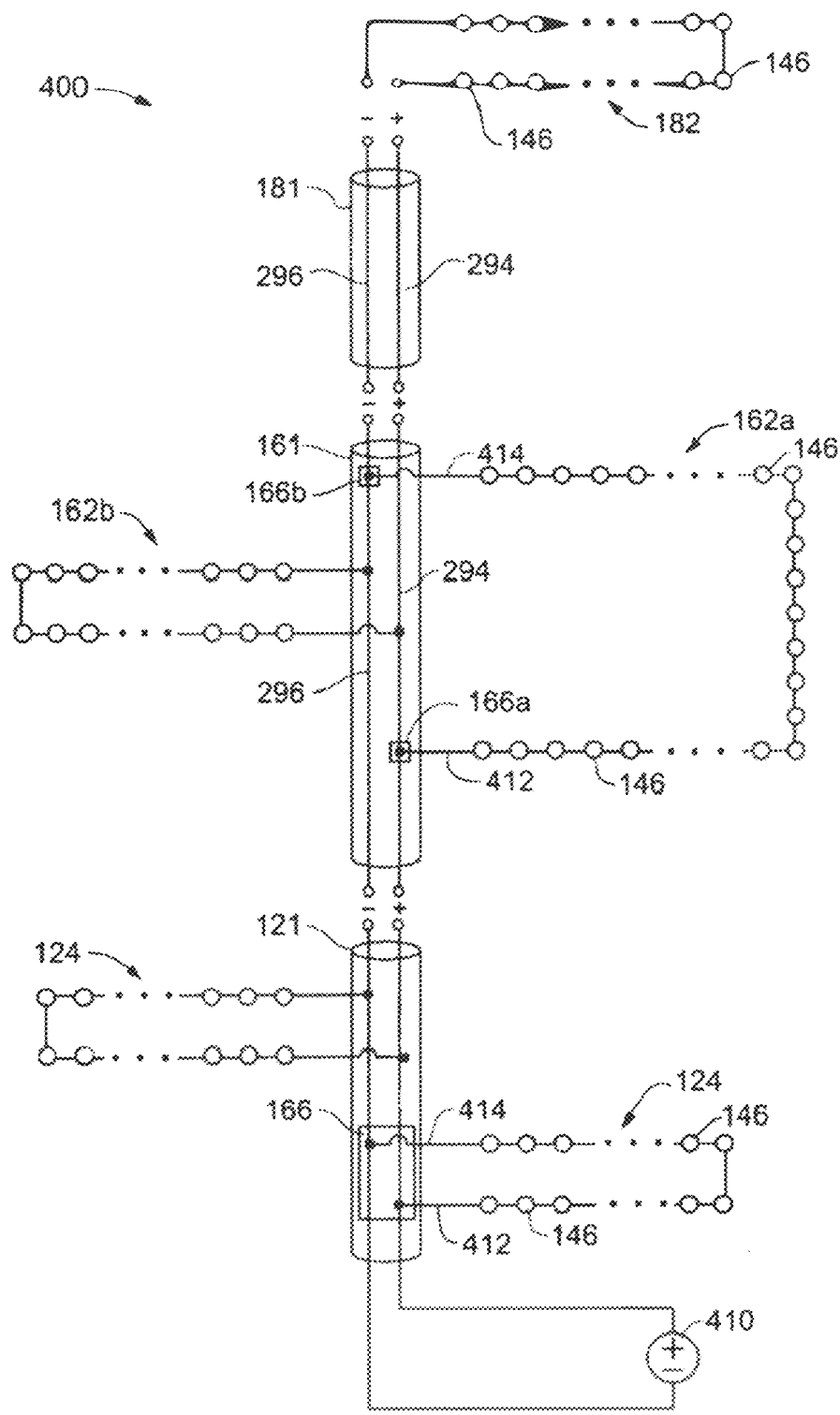
FIG. 19 is an electrical circuit diagram of the modular lighting system depicted in FIG. 17, with light strings having series-connected lighting elements, according to an embodiment of the present invention.
Figure 20:
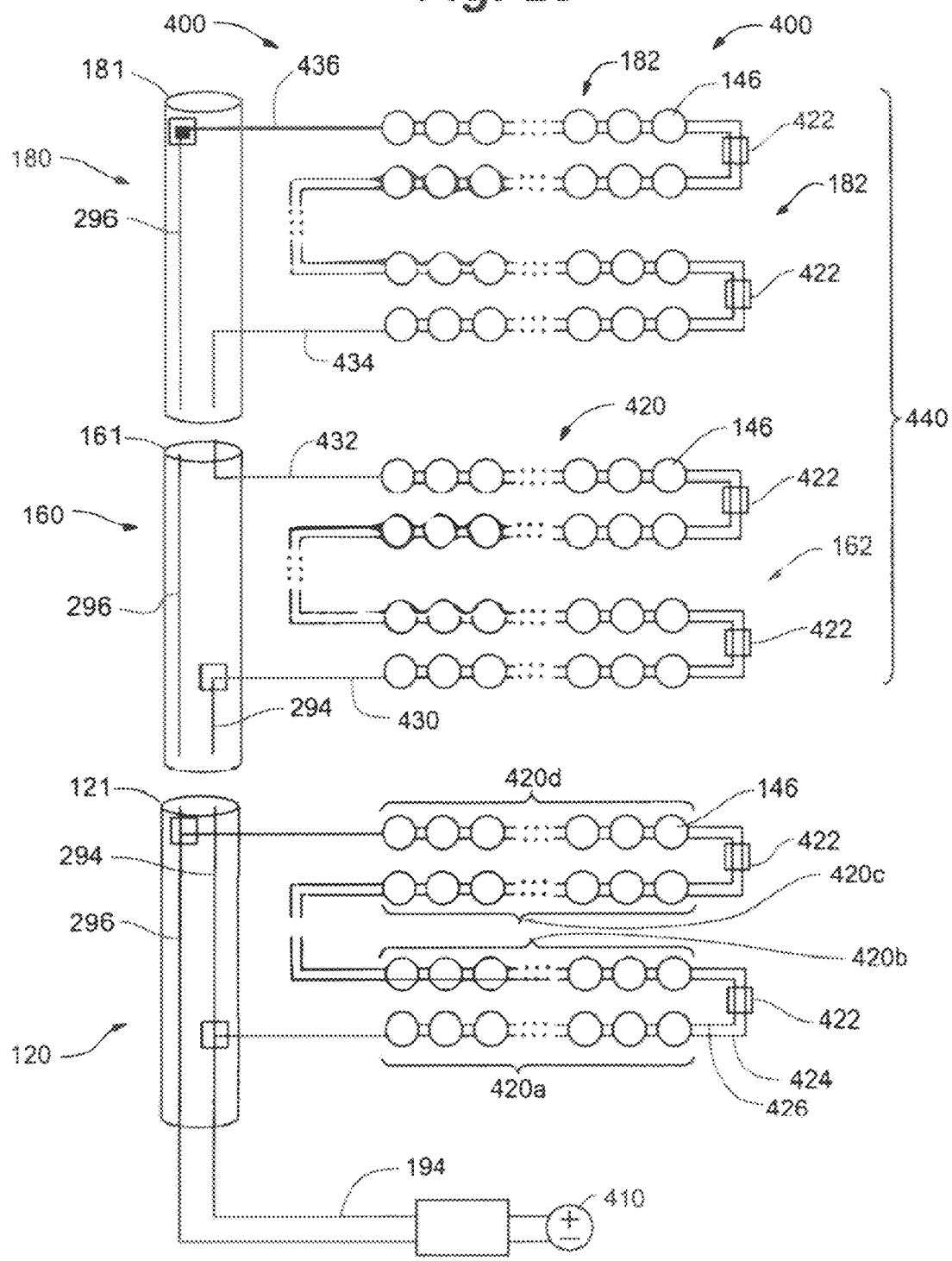
FIG. 20 is an electrical circuit diagram of the modular lighting system depicted in FIG. 17, with light strings having groups of parallel-connected lighting elements connected in series, according to an embodiment of the present invention.
Figure 21:
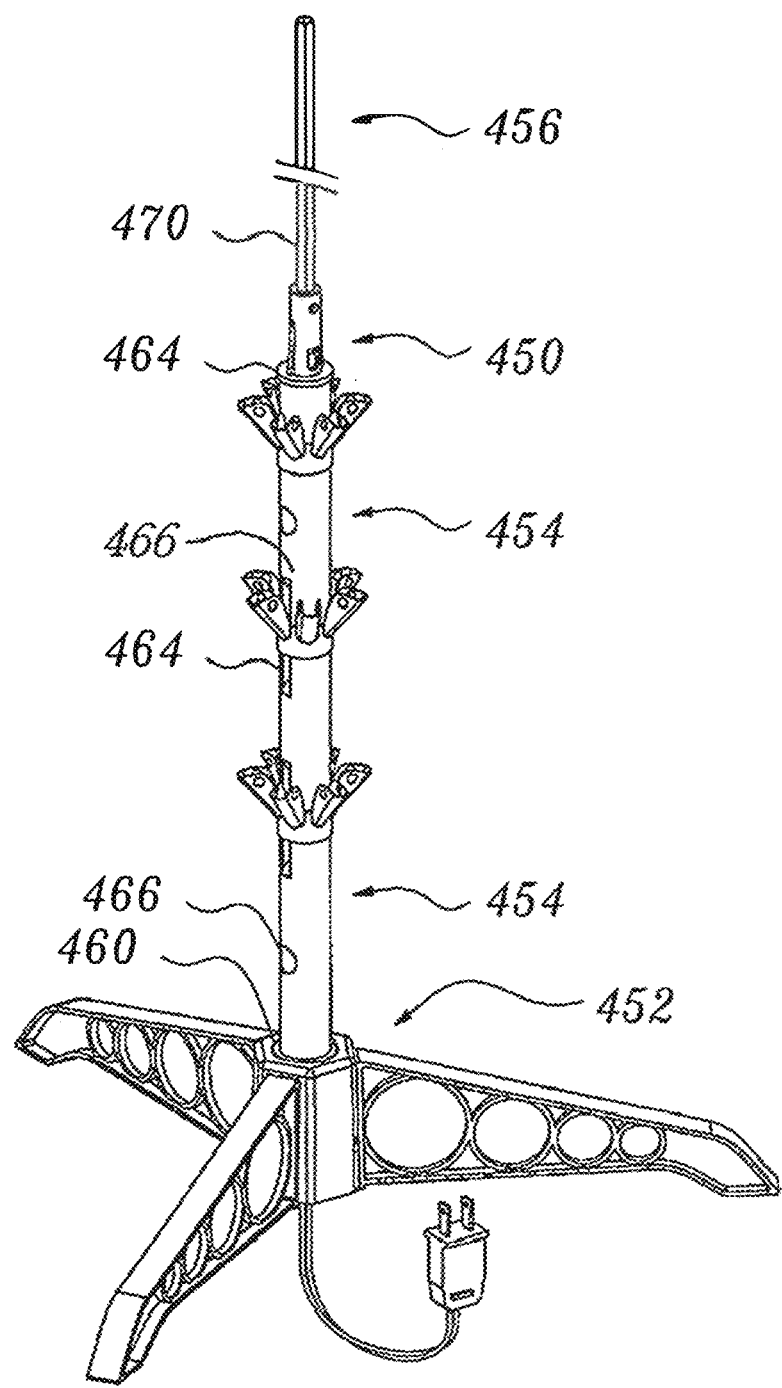
FIG. 21 is a side view of a representative modular tree incorporating a connector assembly and a top connector assembly according to an embodiment of the present invention.

Referring to FIGS. 18-20, schematic diagrams depict several embodiments of lighting system 400 with light strings 124, 162, and 182 having varying electrical configurations.

Referring specifically to FIGS. 18, an electrical schematic of an embodiment of lighting system 400 having only parallel light strings 124, 162, and 182 is depicted.

In the depicted embodiment, lighting elements 146 are connected in parallel to each other to form parallel light strings 124, 162, 182. An advantage to parallel construction is that if one lighting element 146 fails, the remaining lighting elements 146 remain lit. Lighting elements 146 as described above may comprise any known type of lighting element, including incandescent bulbs, LEDs, and so on, with any number of lighting elements 146 included in a string. A number of lighting elements 146 used in a particular lighting string may vary dependent on the overall number of lighting elements 146 desired on tree 100, desired wire gauge, and other such factors. Light connect wires 412 and 414 of a lighting string 124, may connect to or through trunk body 121 through an opening 166 (FIG. 2) common to both wires 412 and 414 to connect to harness 214. In other embodiments, such as the one depicted in FIG. 20, a portion of light string 124 may connect to first wiring harness 214 through more than one opening 166.

Bus wires 294 and 296 interconnect to provide power from power source 410 throughout tree 100. Each light string 124, 162, and 182 is connected to bus wires 294 and 296, thus providing power to all lighting elements 146 on tree 100.

Referring to FIG. 19, an embodiment of lighting system 400 comprising series-connected light strings 124, 162, and 182 is depicted. In this embodiment, all lighting elements 146 of each lighting string are wired electrically in series. In one embodiment, a light string 124 comprises fifty lighting elements 146, each lighting element comprising a 2.5V incandescent bulb, and bus wires 294 and 296 provide 125 VAC power to lighting system 400.

Lighting strings 124 each have a first lead connected to bus wire 294 and a second lead connected to bus 296. In the depicted embodiment, electrical connection to the bus wires is maintained within a single trunk body 121, and in some embodiments, through a single opening 166.

On the other hand, lighting system 400 may include a light string, such as light string 162a that includes a first lead 412 connected to a bus wire 294 through a first opening 166a, and second lead 414 connected to a bus wire 296 through a second opening 166b.

Referring to FIG. 20, in yet another embodiment of modular lighting system 400, light strings 124, 162, and 182 comprise series-parallel configurations.

In the depicted embodiment, light string 124 comprises multiple groups 420 of parallel connected lighting elements 146. Each group 420 includes multiple lighting elements 146 connected in parallel. Because of the parallel connection, and within limits of the current-carrying capacity of the wires of the light string and wiring harnesses, nearly any quantity of lighting elements may be wired in parallel.

Groups 420, including group 420a, 420b, 420c, and 420d, are connected in series to form the parallel-series light string 124. The number of groups 420 may vary from string-to-string, depending on the number of lights strings desired, source voltage, bus voltage, and lighting element rating. In one embodiment having 120 VAC available at bus wires 294 and 296, light string 124 comprises 50 groups 420 having 10 lighting elements 146, each lighting element rated for 2.5V. Such a relatively long string reduces the amount of connections to tree portion 120, and further provides the benefit of parallel construction such that the failure of a single lighting element 146 does not cause all lighting elements 146 to lose power (unlike a pure series-connected light string).

In one embodiment, light string 124 includes multiple group connectors 422. Group connectors 422 facilitate the assembly and connection of multiple groups of parallel-connected lighting elements 146. In one embodiment, lighting elements 146 are assembled onto a pair of initially continuous wires 424 and 426. Alternating portions of wires 424 and 426 are punched out, or otherwise removed such that wires 424 and 426 are discontinuous between groupings 420. Group connectors 422 enclose and isolate the regions of discontinuity of light string 124 between each parallel group 420. Further details of this and similar embodiments of light string 124 and group connector 422 are provided in U.S. application Ser. No. 13/112,749, entitled "Decorative Light String for Artificial Lighted Tree", filed May 20, 2011, and commonly assigned to the assignees of the present application, the contents of which are herein incorporated by reference into the present application.

Still referring to FIG. 20, lights string 162 and 182 may also be constructed of multiple groups 420, each group 420 including multiple parallel-connected lighting elements 146. In this embodiment, unlike the embodiments described above with respect to FIGS. 18 and 19, the pair of bus wires 294 and 296 may not extend through the length of all trunk sections, as is depicted in FIG. 20. In the depicted embodiment, bus wire 294 is terminated within second trunk body 161 where it makes an electrical connection with a first lead 430 of light string 182.

At a first "end" of light string 162, a second lead 432 extends into second trunk body 161 and makes an electrical connection with wiring harness 230 or connector assembly 212 (not depicted in FIG. 20). In this embodiment, connector assembly 212 and its contact set 302 thereby includes an electrical connection to bus wire 296, which is in electrical connection to a power source 410, and lead 432 of light string 162.

Light string 182 likewise may include one or more groups 420 connected in series. Light string 182 includes first lead wire 434 connected to connector 244 or another electrical connector, and second lead wire 436 connected at a second end of light string 182 to bus wire 296. Consequently, light string 162 and 182 combine to form a greater multi-string parallel-series light string 440 which mechanically and electrically spans both second trunk portion 160 and third trunk portion 180. Electrical connection between light strings 162 and 182 is made when second trunk portion 160 is coupled and connected to third trunk portion 180.

Although only one of each light string 124, 162, and 182 is depicted in FIG. 20, it will be understood that more than one light string may be present on tree 100. Further, other or additional light strings, including light string 124, generally may be split between trunk portions in a manner similar to light strings 162 and 182 which form a split light string 440.

As shown in FIGS. 21-26, another embodiment of a modular tree 450 may comprise a base tree section 452, at least one intermediate tree section 454 and a top tree section 456. The base tree section 452 defines a lumen 458 and further comprises a top end 460. Similarly, each intermediate tree section 454 defines a lumen 462 and further comprises a top end 464 and a bottom end 466. Finally, the top tree section 456 defines a lumen 468 and further comprises a bottom end 470.

Figure 25:
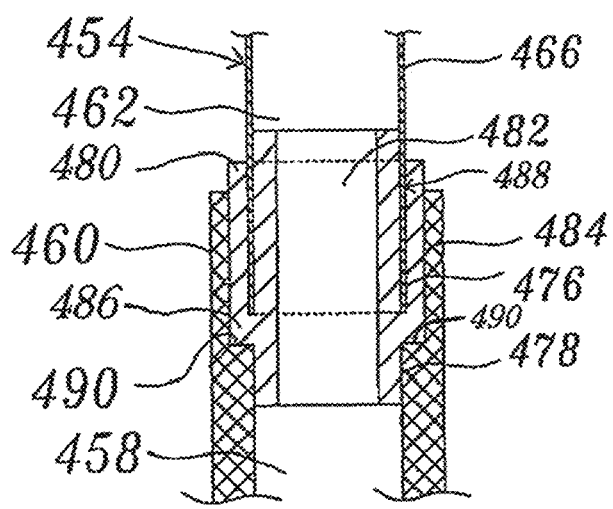
FIG. 25 is a cross-sectional view of the connector assembly joining the base tree section and the intermediate tree section.

As shown specifically in FIGS. 22 to 23 and 25, according to an embodiment, the bottom connector assembly 472 can further comprise a supporting connector 474 for connecting the intermediate tree section 454 to the base tree section 452. The supporting connector 474 further comprises an elongated body 476 defining an internal lumen 482 and having a first end 478 and a second end 480. The connector body 476 can further comprise a positioning portion defining a shoulder 486 and a receiving groove 488.

In operation, the first end 478 of the supporting connector 474 is inserted into the lumen 458 of the base tree section 452. In this configuration, the base tree section 452 further comprises a shoulder 490 for engaging the shoulder 486 of the positioning portion 484 to limit the depth of the supporting connector 474 within the base tree section 452 and position the receiving groove 490 proximate to the top end 460 of the base section 452. The bottom end 466 of one of the intermediate tree sections 454 can be fitted over the second end 480 of the supporting connector 474 until the bottom end 466 is received within the receiving groove 488 to join the intermediate trunk section 454 to the base section 452. According to an embodiment of the present invention, two intermediate tree sections 454 can also be joined by the supporting connector 474.

Figure 26:
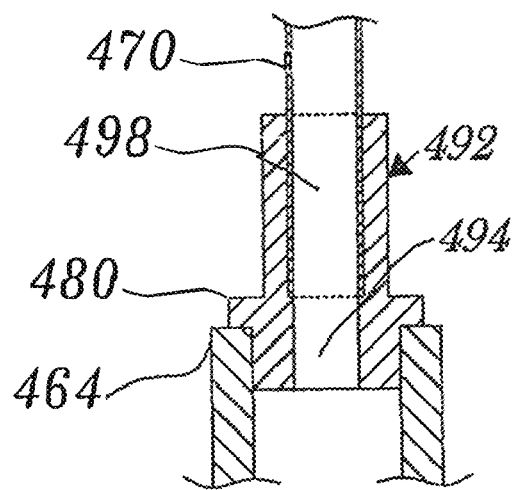
FIG. 26 is a cross-sectional view of the top connector assembly joining the intermediate tree section and the top tree section.

As shown in FIGS. 22, 24 and 26, according to an embodiment of the present invention, the modular tree 450 can further comprise a top connector assembly 492 for joining one of the intermediate trunk section 454 with the top tree section 456. The top connector assembly 492 defines a top connector lumen 494 and further comprises a first end 496 and a receiving port 498. The top connector assembly 492 can further comprise a rim 480 defined radially around the top connector assembly 492.

In operation, the first end 496 of the top connector assembly 492 is inserted into the upper end 464 of one of the intermediate tree section 454 until the rim 480 engages the upper end 464 of the intermediate tree section 454. Top portion 470 of the top tree section 456 can then be inserted into the receiving port 498 to complete the joining the intermediate tree section 454 with the top tree section 456. As depicted, the top portion 470 of the top tree section 456 and the receiving port 498 can comprise corresponding hexagonal cross-sections. The corresponding hexagonal cross-sections prevent independent rotation of the top tree section 456 relative to the intermediate tree section 454. According to embodiments of the present invention, the corresponding cross-sections of the top portion 470 of the top tree section 456 and the receiving port 498 can comprise circular, square or any other conventional polygonal cross-sections.

As depicted in FIGS. 22 to 24, the modular tree 450 can further comprise a wire assembly 500 comprising at least one base wire 502 positioned within the lumen 458 of the base tree section 452, at least one intermediate wire 504 positioned within the lumen 462 of each of the intermediate tree sections 454, and at least one top wire 506 positioned within the lumen 468 of the top tree section 456. In this configuration, a base socket 508 operably engaged to the base wire 502 is positioned within the lumen 458 of the base tree section 452 and an intermediate socket 510 operably engaged to the intermediate wire 504 is positioned within the lumen 462 of each of the intermediate tree sections 454. Similarly, the connector assembly 472 can further comprise a connector plug 512 positioned within the internal lumen 482 and that can be engaged to the base socket 508. The bottom connector assembly 472 can also further comprise a top connector plug 514 positioned within the internal lumen 494 and that can be engaged to the intermediate socket 510.

As depicted in FIGS. 22 to 25, the plugs 512, 514 comprise a pair of prongs, or electrical leads, 513, 515, but in other embodiments may comprise a coaxial arrangement with a first lead located centrally in the plug and a second lead or contact extending circumferentially around the first lead, similar to the coaxial lead arrangements discussed above. According to an embodiment, each plug 512, 514 can comprise a keyed protrusion 516 engagable to a corresponding groove in the internal lumen 482 of the bottom connector assembly 472 or the top connector lumen 494. The interlocking keyed protrusion 516 and the groove prevent the plug 512, 514 from rotating independently of the connector assembly 472 or the top connector assembly 492. According to an embodiment, the plug 512, 514 can further comprise a plug guard 520 on the end of the plug 512, 514 that is positioned between the plug 512, 514 and the socket 508, 510 when engaged together. Similarly, the socket 508, 510 can further comprise a socket guard 522 that is positioned between the plug 512, 514 and the socket 508, 510 when engaged together.

As depicted in FIGS. 22 to 25, the connector assembly 472 can further comprise a keyed protrusion 524 on the exterior of the supporting connector 474 engagable to a corresponding groove 526 defined by the lumen 458 of the base tree section 452. Similarly, the top connector assembly 492 can similarly comprise a keyed protrusion on the exterior of the top connector assembly 492 engagable to a corresponding groove defined by the lumen 462 of the intermediate tree section 454. The keyed protrusions maintain the alignment of the tree sections 452, 454, 456 to prevent kinking of the wire assembly 500.

Figure 27:
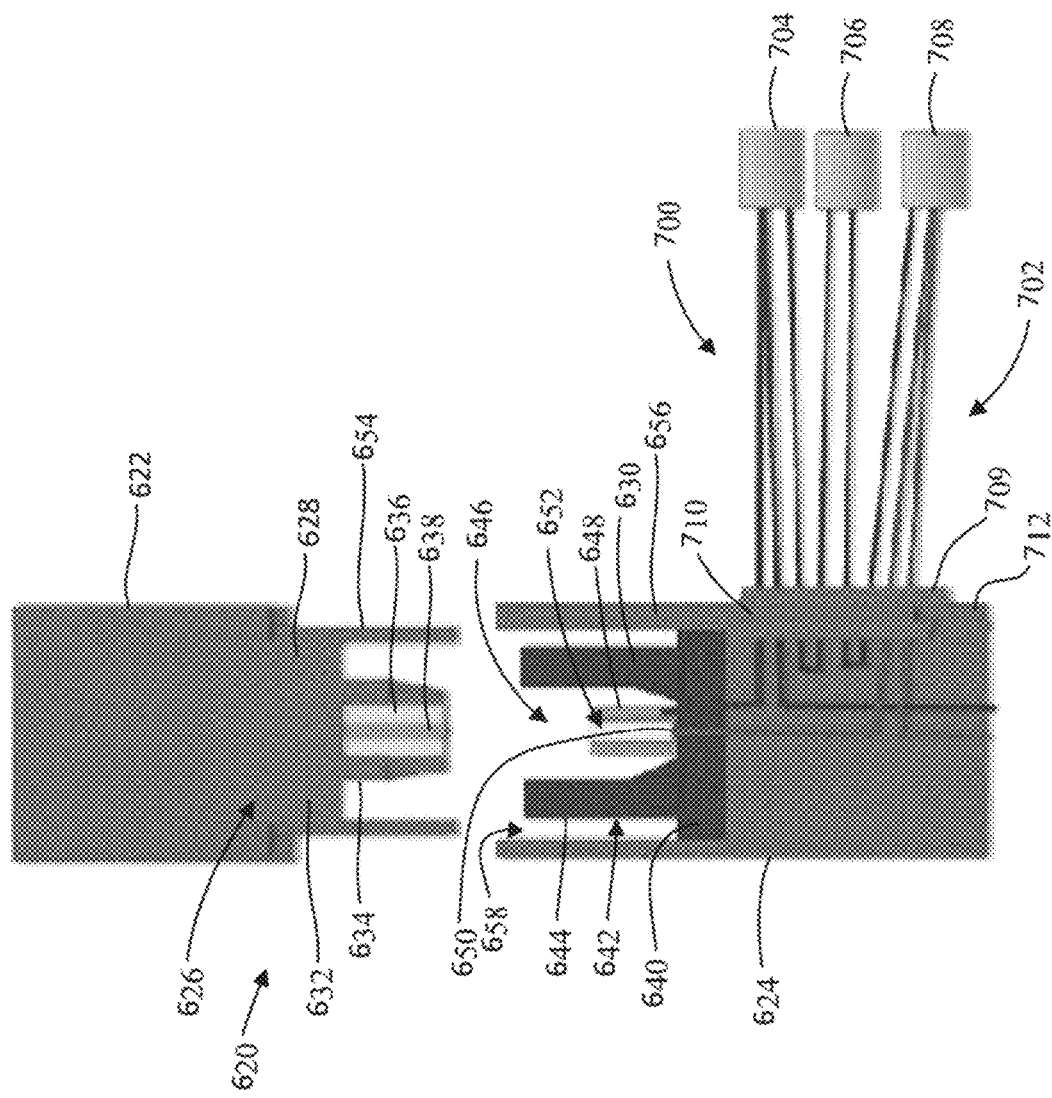
FIG. 27 is a front view of an embodiment of two portions of a trunk of an artificial pre-lit tree with an embodiment of a connection system.

Referring to FIG. 27, two portions of a trunk of an artificial pre-lit tree with a connecting system different from those described above is depicted. In this alternative embodiment, trunk 620 comprises upper portion 622 and lower portion 624. Upper portion 622 is electrically connected to lower portion 624 via barrel connector 626. Barrel connector 626 includes barrel portion 628, depicted as a male upper portion, which fits into receiver portion 630, depicted as a female lower portion. It will be understood that although barrel portion 628 is depicted as assembled into upper portion 622 of trunk 620, and receiver portion 628 is depicted as assembled into lower portion 624 of trunk 620, the barrel connector 626 portions could be reversed, such that barrel portion 628 and receiver portion 630 are assembled into lower portion 624 and upper portion 622, respectively.

Barrel portion 628 includes base portion 632 and projection 634. Projection 634 projects from base 632 and is generally cylindrical. In the embodiment depicted, projection 634 may be tapered near an end, may be cylindrical from top to bottom, or in alternate embodiments may comprise a rectangular projection.

Barrel portion 628 also includes a pair of electrical connectors, outer electrical connector 636 and inner electrical connector 638. In one embodiment, outer connector 636 comprises a cylindrical shape defining an inner recess and outer wall. The outer wall comprises conductive material. Inner connector 638 in an embodiment comprises a cylindrical projection comprised of a conductive material.

Receiver portion 630 comprises a base portion 640 and receiving portion 642. Receiving portion 642 generally projects away from base 640. Receiving portion 642 includes walls 644 and defines barrel receiving recess 646. Walls 644 may comprise a single, cylindrical wall, or in the case of a rectangular or other shape, may comprise multiple walls. Walls 644 define barrel receiving portion 646, which is generally shaped to receive projection 634.

Receiver portion 630 also includes a pair of electrical connectors, outer connector 648 and inner connector 650. Outer connector 648 in one embodiment comprises a conductive cylinder forming a recess 652 for receiving electrical connector 638. An inside surface of connector 648 may be insulated to avoid creating an electrical connection between connector 638 and connector 648. Inner connector 650 in one embodiment comprises a pad-like, flat connection point for contacting with an end of electrical connector 638.

When upper portion 622 of trunk 620 is mechanically connected to lower portion 624, in the embodiment depicted, projecting wall 654 fits into slot 658 formed by outer wall 656 of lower portion 624 and receiver portion 630, thus forming a secure mechanical connection between upper and lower portions 622 and 624 of trunk 620.

When upper portion 622 and lower portion 624 are mechanically connected, the upper and lower portions 622 and 624 also become electrically connected as barrel portion 628 of barrel connector 626 fits into receiver portion 630. When connected together, connectors 638 and 650 form a first electrical connection, and connectors 636 and 648 form a second electrical connection, thus electrically connecting upper portion 622 of trunk 620 with lower portion 624.

Still referring to FIG. 27, a portion of an alternate embodiment of a modular lighting system 700 of the present invention is also depicted. In the depicted, alternate embodiment, system 700 utilizes a series-parallel construction with respect to the illumination of bulbs of clusters, such that multiple clusters are electrically connected in series, but individual bulbs of each cluster are electrically connected in parallel.

In the depicted embodiment, system 700 includes wiring harness 702, cluster connectors 704, 706, and 708, harness-tree plug 709, and clusters (not depicted). In the depicted embodiment, system 700 includes three sets of cluster connectors and clusters, but it will be understood that any number of series-connected clusters and cluster connectors may be used.

Wiring harness 702 includes multiple individual wires forming the electrical series connections between clusters 704, 706, and 708, and delivering primary DC power from trunk portion 724 to trunk portion 622. DC power will be available at electrical connectors 650 and 648 via wiring harness 702. Portions of wiring harness 702 and its wires may be located within trunk 620, portions of may be located external to trunk 620, as depicted.

Harness-tree plug 709 is received into a recess in lower portion 624 of trunk 620. In one embodiment, plug 709 includes circular slot 710 which mates with outer wall 712 of trunk portion 624 to secure plug 709 in trunk 620. Harness-tree plug 709 may include holes or recesses for wires of harness 702 to exit trunk 620. In one embodiment, harness-tree plug 709 is comprised of a rigid material, but in other embodiments, harness-tree plug 608 is comprised of a flexible material, such as rubber.

As depicted, wires of harness 702 extend through harness-tree plug 709 such that portions of the wire of harness 702 are external to trunk 620, and connected to cluster connectors 704, 706, and 708. In some embodiments, lengths of wires of harness 702 extend far enough outwardly from trunk 620 such that they may be wrapped about branches of the tree. In alternate embodiments, wires of harness 702 may not extend outside plug 709. It will be understood that the mechanical and electrical connections described with respect to FIG. 27 may be applied to multiple trunk 620 connections for a single artificial, pre-lit tree of the present invention, rather than the single, exemplary connection depicted.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims. Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A modular artificial tree, comprising:
    a first tree portion with a first vertically-tiered trunk electrical connector and a first trunk portion, the first vertically-tiered trunk electrical connector positioned inside the first trunk portion and including a first pair of electrical contacts, a first non-conductive portion having a first tier portion and a second tier portion, the second tier portion vertically displaced from the first tiered portion and defining a radially-extending outside diameter that is less than a radially-extending outside diameter of the first tier portion; and
    a second tree portion including a second trunk electrical connector and a second trunk portion, the second trunk electrical connector positioned at least partially inside the second trunk portion and including a second pair of electrical contacts and a second non-conductive portion defining a connector-receiving surface configured to receive and abut the second tier portion of the first vertically-tiered trunk electrical connector; and
    wherein an end of the first trunk portion is configured to mechanically couple to an end of the second trunk portion when the first tree portion is connected to the second tree portion, such that the second tier portion of the first non-conductive portion is received by the connector-receiving surface of the second non-conductive portion, thereby making an external mechanical tree connection and an internal mechanical tree connection, and the pair of first electrical contacts makes electrical connection with the second pair of electrical contacts, thereby making an electrical connection between the first tree portion and the second tree portion at the same time that the external and internal mechanical tree connections are made.

2. The modular artificial tree of claim 1, wherein the second tier portion of the first non-conductive portion forms a disk shape.

3. The modular artificial tree of claim 2, wherein the connector receiving surface of the second non-conductive portion is circular.

4. The modular artificial tree of claim 1, wherein the second tier portion of the first non-conductive portion forms a cylindrical shape.

5. The modular artificial tree of claim 1, wherein the connector receiving surface of the second non-conductive portion is circular.

6. The modular artificial tree of claim 1, wherein each of the first and the second trunk electrical connectors are coaxial connectors.

7. The modular artificial tree of claim 6, wherein the first pair electrical contacts and the second pair of electrical contacts each form a coaxial contact set.

8. The modular artificial tree of claim 1, wherein the first tree portion includes a first plurality of branches having one or more first light strings on the first plurality of branches and wherein the second tree portion includes a second plurality of branches having one or more second light strings on the second plurality of branches.

9. The modular artificial tree of claim 8, wherein the one or more light strings includes two light strings connected end to end.

10. The modular artificial tree of claim 9, wherein one of the two light strings is electrically connected to the other of the two light strings in parallel.

11. The modular artificial tree of claim 10, wherein the two light strings include wires having 22 AWG conductors.

12. The modular artificial tree of claim 1, wherein after mechanical coupling, the first trunk portion and the second trunk portion overlap one another.

13. The modular artificial tree of claim 12, wherein the first and second trunk portions are in direct contact with one another.

14. The lighted artificial tree of claim 12, further comprising a sleeve for connecting the first trunk portion and the second trunk portion.

15. The lighted artificial tree of claim 1, wherein the first pair of electrical contacts includes a first electrical contact aligned along a central vertical axis of the first tree portion.

16. The lighted artificial tree of claim 1, wherein the first tier portion of the non-conductive portion is in direct contact with an inner surface of the first trunk portion and the second tier portion of the first non-conductive portion is not in contact with the inner surface of the first trunk portion.

17. The lighted artificial tree of claim 16, further comprising a first light string on the first tree portion, the first light string including a first group of lighting elements and a second group of lighting elements, the first group of lighting elements electrically connected to the second set of light elements in series.

18. The lighted artificial tree of claim 17, wherein the first group of lighting elements includes a plurality of lighting elements electrically connected to one another in parallel.

19. The lighted artificial tree of claim 18, wherein each lighting element of the plurality of lighting elements comprises a light-emitting diode (LED).

20. The lighted artificial tree of claim 17, further comprising a second light string electrically connected to the first light string in parallel.

* * * * *